United States Patent
Kovacs et al.

(10) Patent No.: US 10,230,119 B2
(45) Date of Patent: Mar. 12, 2019

(54) WATER MANAGEMENT IN ELECTROCHEMICAL SYSTEMS

(71) Applicant: L3 Open Water Power, Inc., Somerville, MA (US)

(72) Inventors: Jason R. Kovacs, Somerville, MA (US); Ian S. McKay, Seattle, WA (US); David H. Porter, Somerville, MA (US); Thomas B. Milnes, Beverly, MA (US)

(73) Assignee: L3 Open Water Power, Inc., Somerville, MA (US)

( * ) Notice: Subject to any disclaimer, the term of this patent is extended or adjusted under 35 U.S.C. 154(b) by 0 days.

(21) Appl. No.: 15/904,394

(22) Filed: Feb. 25, 2018

(65) Prior Publication Data

US 2018/0183082 A1    Jun. 28, 2018

Related U.S. Application Data

(60) Division of application No. 15/713,617, filed on Sep. 23, 2017, now Pat. No. 10,003,095, which is a continuation of application No. PCT/US2017/018994, filed on Feb. 23, 2017.

(60) Provisional application No. 62/298,877, filed on Feb. 23, 2016, provisional application No. 62/361,786, filed on Jul. 13, 2016.

(51) Int. Cl.
| | | |
|---|---|---|
| *H01M 8/22* | (2006.01) |
| *H01M 8/06* | (2016.01) |
| *H01M 8/04082* | (2016.01) |
| *H01M 8/083* | (2016.01) |
| *C25B 1/00* | (2006.01) |
| *C25B 9/00* | (2006.01) |
| *C02F 1/00* | (2006.01) |
| *C02F 1/46* | (2006.01) |
| *H01M 12/06* | (2006.01) |
| *C02F 1/52* | (2006.01) |
| *C02F 101/10* | (2006.01) |

(52) U.S. Cl.
CPC ............ *H01M 8/0693* (2013.01); *C25B 1/00* (2013.01); *C25B 9/00* (2013.01); *H01M 8/04201* (2013.01); *H01M 8/083* (2013.01); *H01M 8/22* (2013.01); *C02F 1/001* (2013.01); *C02F 1/46* (2013.01); *C02F 2001/5218* (2013.01); *C02F 2101/10* (2013.01); *H01M 12/06* (2013.01); *H01M 2300/0014* (2013.01)

(58) Field of Classification Search
CPC ....... H01M 8/0693; H01M 8/22; H01M 8/083
See application file for complete search history.

(56) References Cited

U.S. PATENT DOCUMENTS

| | | |
|---|---|---|
| 3,067,276 A | 12/1962 | Gruneberg et al. |
| 4,305,999 A | 12/1981 | Zaromb |

(Continued)

OTHER PUBLICATIONS

Merriam-Webster's definition of porous (https://www.merriam-webster.com/dictionary/porous [8/23/20189:55:58]) (Year: 2018).*

(Continued)

*Primary Examiner* — Jeremiah R Smith
(74) *Attorney, Agent, or Firm* — Danielson Legal LLC

(57) ABSTRACT

Waste management in electrochemical systems, such as electrochemical systems in which an electrochemically active material comprising aluminum is employed, is generally described.

12 Claims, 12 Drawing Sheets

(56) References Cited

U.S. PATENT DOCUMENTS

| | | | |
|---|---|---|---|
| 4,994,332 A | 2/1991 | Coin | |
| 5,004,654 A | 4/1991 | Hunter et al. | |
| 10,003,095 B2* | 6/2018 | Kovacs | H01M 8/04201 |
| 2008/0314838 A1* | 12/2008 | Becker | B07B 4/08 |
| | | | 210/718 |
| 2010/0316935 A1 | 12/2010 | Friesen et al. | |
| 2012/0293110 A1* | 11/2012 | Frederick | H01M 4/46 |
| | | | 320/101 |
| 2016/0294000 A1 | 10/2016 | He et al. | |

OTHER PUBLICATIONS

International search report for PCT/US2017/18994, dated Jul. 10, 2017, 4 pages.

Written opinion for PCT/US2017/18994, dated Jul. 10, 2017-07-10, 7 pages.

Office action for U.S. Appl. No. 15/713,617, dated Mar. 2, 2018, 16 pages.

\* cited by examiner

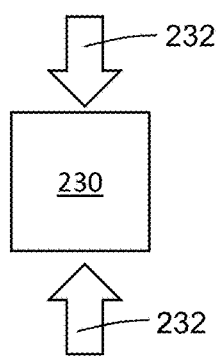
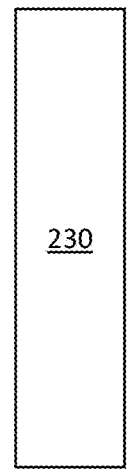
*FIG. 3A*    *FIG. 3B*
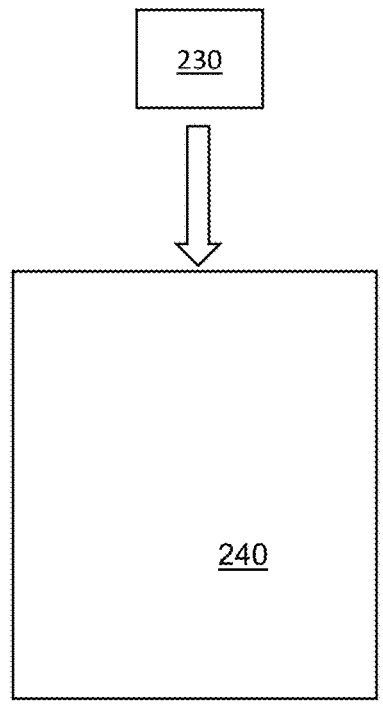
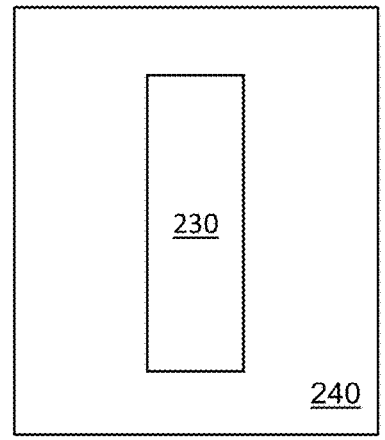
*FIG. 3C*    *FIG. 3D*

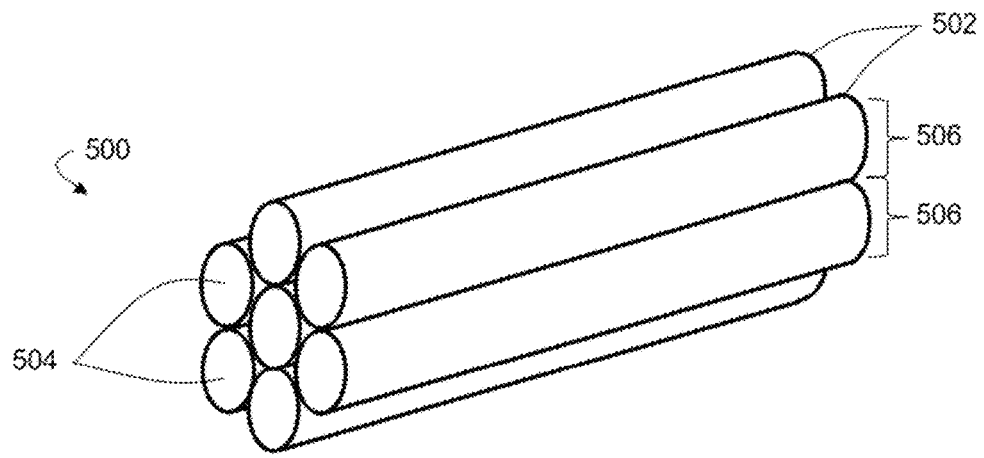
FIG. 5A
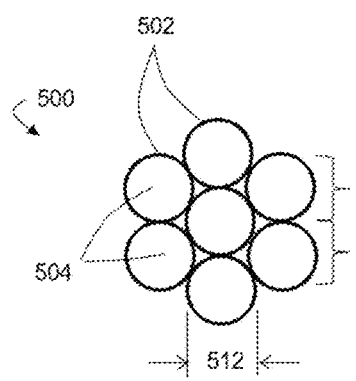
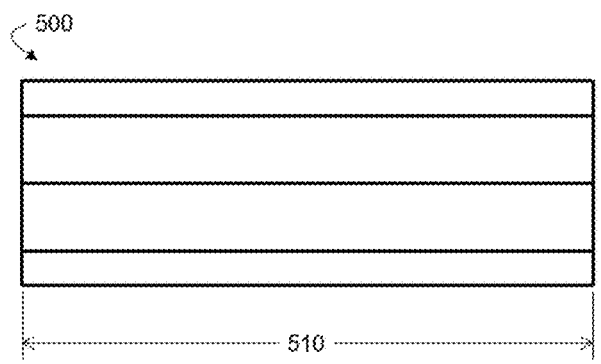
FIG. 5B  FIG. 5C

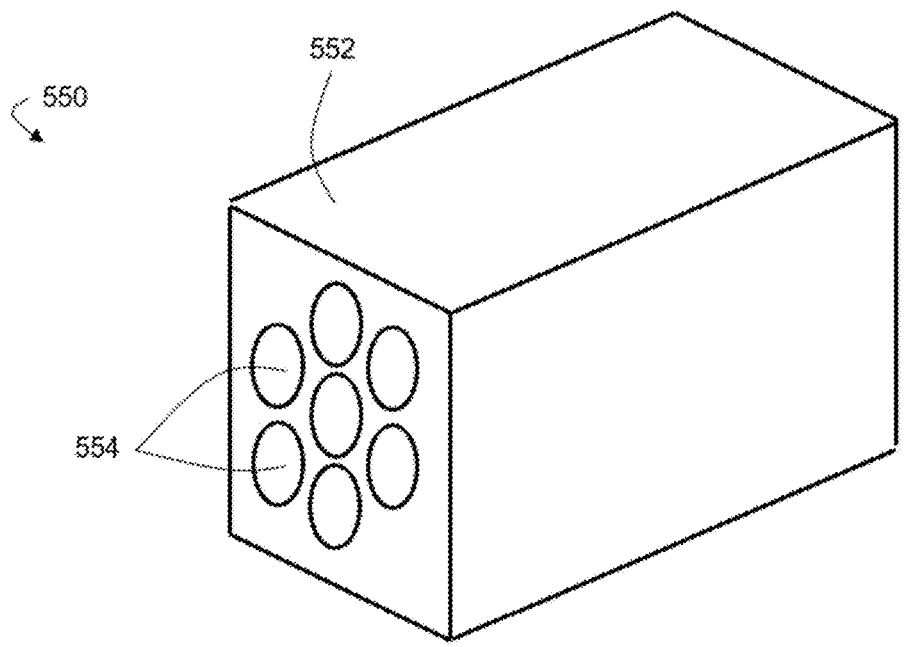
FIG. 5D
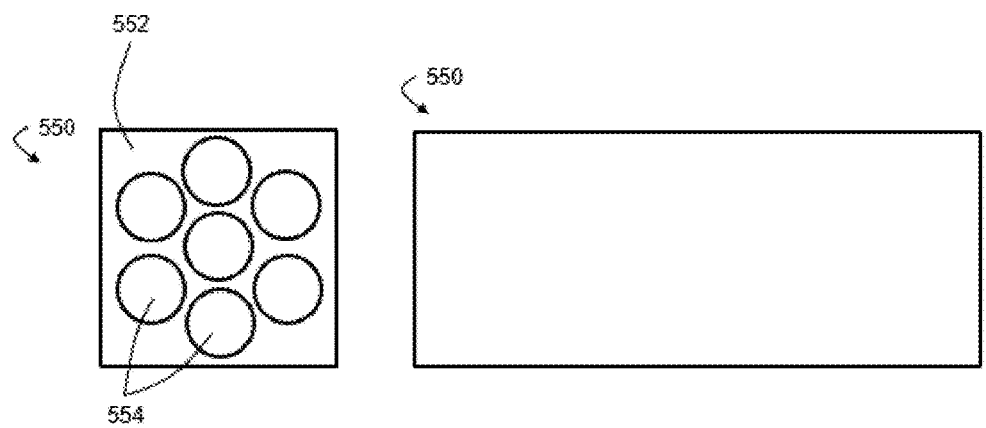
FIG. 5E  FIG. 5F

WATER MANAGEMENT IN ELECTROCHEMICAL SYSTEMS

CROSS REFERENCE TO RELATED APPLICATIONS

The present application is a divisional of U.S. patent application Ser. No. 15/713,617, which itself is a continuation of International (PCT) Patent Application No. PCT/US2017/018994, filed internationally on Feb. 23, 2017, which claims priority to and the benefit of each of U.S. Provisional Appl. No. 62/298,877, filed on Feb. 23, 2016, and U.S. Provisional Appl. No. 62/361,786, filed on Jul. 13, 2016. The entire disclosure of each of these applications is hereby incorporated by reference as if set forth in their entirety herein.

TECHNICAL FIELD

This invention generally relates to systems and methods for waste management and, more particularly but not exclusively, to waste management in electrochemical systems.

SUMMARY

This summary is provided to introduce a selection of concepts in a simplified form that are further described below in the Detailed Description section. This summary is not intended to identify or exclude key features or essential features of the claimed subject matter, nor is it intended to be used as an aid in determining the scope of the claimed subject matter.

The present disclosure is related to waste management in electrochemical systems. The subject matter of the present invention involves, in some cases, interrelated products, alternative solutions to a particular problem, and/or a plurality of different uses of one or more systems and/or articles.

In one aspect, embodiments relate to a method of operating an electrochemical system. The method includes transporting an electrolyte of the electrochemical system through a porous medium such that a solid comprising aluminum is precipitated on a surface of the porous medium, wherein at least a portion of the aluminum within the solid originates from a product of an electrochemical reaction carried out within the electrochemical system.

In one embodiment, at least 10% wt of the precipitation occurs within pores of the porous medium.

In one embodiment, the electrolyte is transported through the porous medium by a pump; by gravity; by convection caused by a thermal gradient, bubbles of rising gas, or a supercritical fluid; or by molecular diffusion.

In one embodiment, the solid comprises at least one of aluminum hydroxide ($Al(OH)_3$), aluminum oxide ($Al_2O_3$), and aluminum oxide hydroxide ($AlO(OH)$).

In one embodiment, the porous medium includes at least one of an open cell foam, a prismatic medium, a polymer, and a functionalized surface.

In one embodiment, an average pore diameter of pores of the porous medium is greater than or equal to 1 micrometer and less than or equal to 10 cm.

In one embodiment, at least part of the porous medium is capable of being removed from the system without damaging the porous medium.

In one embodiment, the electrochemical system undergoes an electrochemical reaction that generates at least one of a gas and a supercritical fluid.

In one embodiment, the method further includes operating the electrochemical system such that aluminum is reacted with oxygen or water to generate electricity and a product comprising the aluminum, and at least a portion of the product comprising the aluminum is precipitated on a surface of the porous medium.

In one embodiment, the method further includes operating the electrochemical system such that the porous medium is expanded during operation of the electrochemical system.

In yet another aspect, embodiments relate to a method for collecting aluminate waste. The method includes transporting a super-saturated aluminate stream through an open cell foam such that aluminum hydroxide is precipitated on the open cell foam, wherein at least 10% wt of the precipitation occurs within pores of the open cell foam.

In one embodiment, the super-saturated stream is transported through the open cell foam by a pump; by gravity; by convection caused by a thermal gradient, bubbles of rising gas, or a supercritical fluid; or by molecular diffusion.

In yet another aspect, embodiments relate to an electrochemical system. The system includes a first electrode comprising an electrochemically active material comprising aluminum; a second electrode; and a porous medium, wherein the porous medium is compressed prior to use such that it occupies a geometric volume that is less than or equal to 80% of a geometric volume of the porous medium when the porous medium is in an unstrained state, the porous medium further containing externally-accessible pores that define either: a cumulative pore volume that makes up at least 5% of the volume of the electromechanical system that is accessible by an electrolyte, or a cumulative surface area that makes up at least 10% of the surface area of the electrochemical system that is accessible by an electrolyte, excluding the surface area of the electrodes that is accessible by an electrolyte.

In yet another aspect, embodiments relate to an electrochemical system. The system includes an electrode comprising an electrochemically active material comprising aluminum; and a porous medium, wherein the porous medium is configured such that a solid comprising aluminum can be precipitated on a surface of the porous medium.

In one embodiment, the electrochemical system comprises a pump fluidically connected to at least one of a liquid and a supercritical fluid electrolyte.

In one embodiment, the electrochemical system is an aluminum-water based electrochemical or an aluminum-air based electrochemical system.

In one embodiment, the electrode further comprises at least one of gallium, indium, magnesium, and tin.

In one embodiment, the porous medium comprises at least one of an open cell foam, a prismatic medium, a polymer, and a functionalized surface.

In one embodiment, an average pore diameter of the pores of the porous medium is greater than or equal to 1 micrometer and less than or equal to 10 cm.

In one embodiment, wherein at least part of the porous medium is capable of being removed from the system without damaging the porous medium.

In one embodiment, the electrochemical system is configured to undergo an electrochemical reaction that generates at least one of a gas and a supercritical fluid.

In one embodiment, the porous medium is compressed prior to use such that it occupies a geometric volume that is less than or equal to 80% of a geometric volume of the porous medium when the porous medium is in an unstrained state and/or expanded for use.

In one embodiment, the porous medium occupies at least five percent of the volume or surface area of the electrochemical system that is accessible by an electrolyte.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures:

FIG. 3A is a schematic diagram of a compressed porous medium in a strained state, according to some embodiments;

FIG. 3B is, according to some embodiments, a schematic diagram of a porous medium in an unstrained state;

FIG. 3C is a schematic diagram of a dry porous medium and an electrolyte before they have been combined, according to certain embodiments;

FIG. 3D is a schematic diagram of a wetted porous medium and an electrolyte after they have been combined, according to some embodiments;

FIG. 5A is a perspective view schematic diagram of an exemplary prismatic medium, which may be used as a porous medium according to some embodiments;

FIG. 5B is a front view schematic illustration of the exemplary prismatic medium shown in FIG. 5A;

FIG. 5C is a side view schematic illustration of the exemplary prismatic medium shown in FIGS. 5A and 5B;

FIG. 5D is a perspective view schematic diagram of an exemplary prismatic medium, which may be used as a porous medium according to some embodiments;

FIG. 5E is a front view schematic illustration of the exemplary prismatic medium shown in FIG. 5D;

FIG. 5F is a side view schematic illustration of the exemplary prismatic medium shown in FIGS. 5D and 5E;

DETAILED DESCRIPTION

Figure 1A:
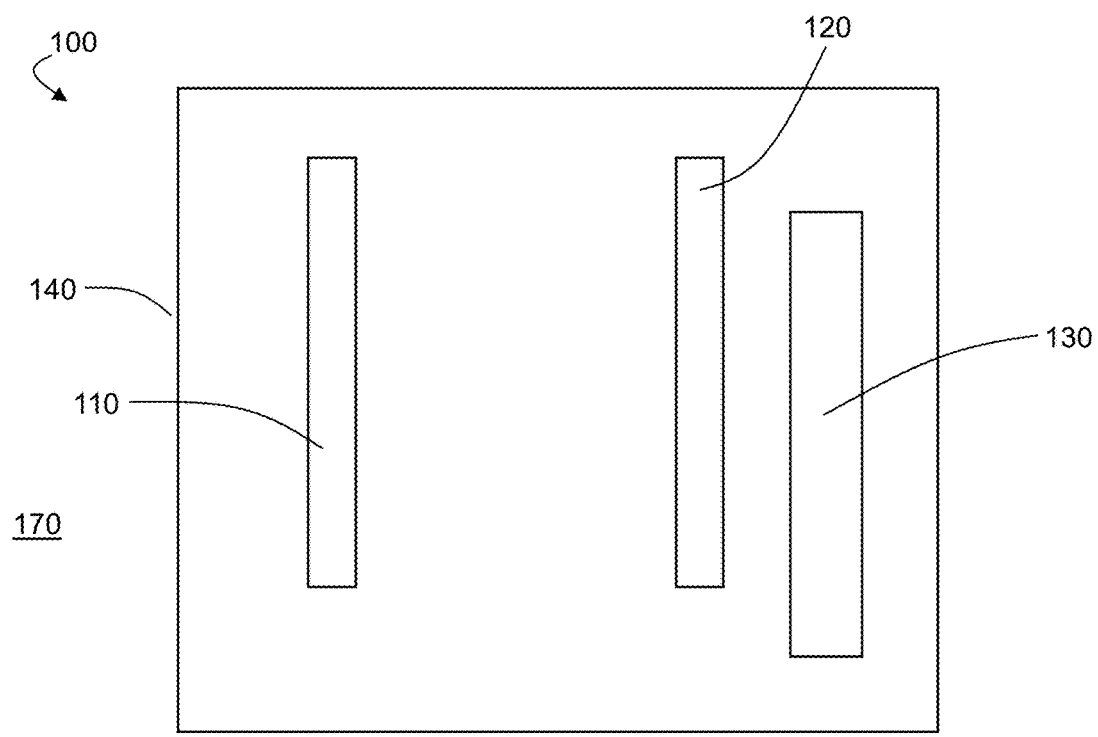
FIG. 1A is a schematic diagram of an electrochemical system, according to certain embodiments.

Various embodiments are described more fully below with reference to the accompanying drawings, which form a part hereof, and which show specific exemplary embodiments. However, the concepts of the present disclosure may be implemented in many different forms and should not be construed as limited to the embodiments set forth herein; rather, these embodiments are provided as part of a thorough and complete disclosure, to fully convey the scope of the concepts, techniques and implementations of the present disclosure to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

Reference in the specification to "one embodiment" or to "an embodiment" means that a particular feature, structure, or characteristic described in connection with the embodiments is included in at least one example implementation or technique in accordance with the present disclosure. The appearances of the phrase "in one embodiment" in various places in the specification are not necessarily all referring to the same embodiment.

In addition, the language used in the specification has been principally selected for readability and instructional purposes and may not have been selected to delineate or circumscribe the disclosed subject matter. Accordingly, the present disclosure is intended to be illustrative, and not limiting, of the scope of the concepts discussed herein.

Waste management in electrochemical systems, such as electrochemical systems in which an electrochemically active material comprising aluminum is employed, is generally described. Certain embodiments are related to electrochemical systems comprising porous media. The porous media can comprise externally-accessible pores that can be infiltrated by a liquid, such as an electrolyte of the electrochemical system. According to some embodiments, an electrolyte of the electrochemical system is transported through the porous medium such that a solid comprising aluminum is precipitated on a surface of the porous medium. At least a portion of the aluminum within the solid that is precipitated on the porous medium can originate, according to certain embodiments, from a product of an electrochemical reaction carried out within the electrochemical system. For example, according to certain embodiments, the electrochemical system can include an electrode comprising aluminum, and the aluminum within the electrode can react in an electrochemical reaction used to generate electricity. The aluminum can, according to certain embodiments, form an aluminate waste product. The aluminate waste product can, according to some embodiments, precipitate from the electrolyte on a surface of the porous medium within the electrochemical system, for example, in the form of aluminum hydroxide ($Al(OH)_3$), aluminum oxide ($Al_2O_3$), and/or aluminum oxide hydroxide ($AlO(OH)$).

According to certain embodiments, and as described in more detail below, the pores within the porous medium can provide a relatively large percentage of the surface area of the electrochemical system that is accessible by the electrolyte. The porous medium can, according to some embodiments, include a total pore volume that makes up a relatively large percentage of the total volume of the electrochemical system that is accessible by the electrolyte. Without being bound by any particular theory, it is believed that the use of such porous media can provide a relatively large surface area and/or volume on or within which precipitation may occur, which can result in a relatively large percentage of all precipitation that occurs within the electrochemical system occurring on or within the porous medium. The porous media may optionally have a functionalized surface that increases or otherwise concentrates precipitation within it, as discussed below. By configuring the electrochemical system such that a relatively large percentage of the aluminum-containing precipitate is formed on or within the porous medium, precipitation in undesirable locations (e.g., on or between the electrodes, on or within conduits through which the electrolyte is transported, etc.) can be reduced or eliminated.

According to certain embodiments, the systems and methods described herein can be particularly useful in aluminum-based electrochemical systems, such as aluminum-water electrochemical systems and aluminum-air electrochemical systems. As a non-limiting example, aluminum-water (Al—$H_2O$) fuel cells and batteries generally produce dissolved aluminate as a waste product, which can accumulate in the electrolyte. During closed cycle operation of these devices, the concentration of aluminate waste generally increases as the cell operates until it reaches its solubility limit, after which the aluminate begins to precipitate out as solid aluminum hydroxide. This precipitate generally forms a hard plaque that can interfere with the operation of pumps, valves, and other internal components of the fuel cell system. To use this fuel cell technology commercially, an energy-efficient method to remove the aluminate and aluminum hydroxide precipitate from the electrolyte is desirable. According to certain embodiments, the use of a porous medium to control the location of precipitate formation can allow for relatively easy localization and subsequent removal of solid, aluminum-containing waste from an electrochemical system in which an electrochemically active material of the electrochemical system comprises aluminum.

Certain embodiments are related to electrochemical systems. As used herein, an "electrochemical system" is a system that is configured to generate electrical current via one or more chemical reactions. "Electrochemical reactions" are those reactions within the electrochemical system that, directly or indirectly, produce or consume electrons. The electrons that are produced in the electrochemical reactions can be transferred between an anode and a cathode to generate an electrical current. The electrical current can be used, for example, to provide electricity to an external load. Generally, the electrochemical reactions will include at least one oxidation reaction and at least one reduction reaction. In most cases, the oxidation electrochemical reaction generates electrons as a reaction product, and the reduction electrochemical reaction consumes electrons as reactants. "Electrochemically active material" is the material within the electrochemical system that reacts, in the electrochemical reactions, to generate and/or consume the electrons. The electrochemical system can include a "cathodic electrochemically active material," which refers to the electrochemically active material that reacts at the cathode. The electrochemical system may also include an "anodic electrochemically active material," which refers to the electrochemically active material that reacts at the anode. An exemplary electrochemical system 100 is shown in FIG. 1A.

In certain embodiments, the electrochemical system comprises a first electrode. Generally, an "electrode" corresponds to the solid material within the electrochemical system at which the reduction and oxidation reactions occur during discharge. The anode is the electrode at which oxidation occurs during discharge, and the cathode is the electrode at which reduction occurs during discharge. The electrode will generally comprise at least one electrically conductive material, which can act as a current collector to facilitate the transfer of electrons through the electrode. The electrode, as used herein, includes both the current collector (if present) and any solid electrochemically active material in contact with the current collector, but does not include any electronically conductive leads that connect the anode to the cathode. In instances in which an electrochemically active material is not in solid form (e.g., in the case of an aluminum-water fuel cell, in which water and solubilized hydroxide ions can be non-solid electrochemically active material), the non-solid electrochemically active material does not constitute part of an electrode, as the term "electrode" is used herein. As a non-limiting example, electrochemical system 100 of FIG. 1A comprises first electrode 110.

The electrochemical system, according to certain embodiments, also comprises a second electrode. For example, in FIG. 1A, electrochemical system 100 comprises second electrode 120.

The electrochemical system may also include, according to certain embodiments, other optional components such as, for example, an electrolyte (e.g., a liquid electrolyte which may, for example, facilitate the transport of ions between the electrodes of the electrochemical system during operation), a vessel (e.g., any suitable container), external electrical connections, and the like. Such optional components are described, for example, in more detail below.

In some embodiments, the electrochemical system may produce electricity via an electrochemical process in which electrons are transferred from the first electrode to the second electrode. For example, in certain embodiments, the electrochemical system may be an aluminum-water electrochemical system, in which electricity is generated by electrochemical reactions in which aluminum and water are electrochemically active materials. During operation of an aluminum-water electrochemical system, electrons can be transferred from metallic aluminum, to the load, to the cathode, and then to the electrolyte. In aluminum-water electrochemical systems, aluminate ions and hydrogen gas and/or supercritical fluid may be generated as reaction products. Hydroxide ions may be shuttled between the anode and cathode, according to some such systems. For example, in certain aluminum-water electrochemical systems, and as shown below in Reaction A, aluminum metal can react with hydroxide ions at the anode to produce aluminate ions ($Al(OH)_4^-$) and electrons as reaction products:

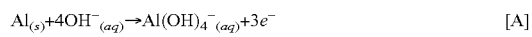
$$Al_{(s)} + 4OH^-_{(aq)} \rightarrow Al(OH)_4^-{}_{(aq)} + 3e^- \qquad [A]$$

The electrons produced at the anode may be transferred to the cathode (e.g., via an electrically conductive material, such as electrode leads), where the electrons may react with water to produce hydroxide ions ($OH^-$ ions) and hydrogen ($H_2$). Reaction B illustrates this process:

$$3H_2O + 3e^- \rightarrow 3OH^-_{(aq)} + 1.5H_2 \qquad [B]$$

The electrochemically active materials in such an exemplary electrochemical system include aluminum and water.

In some embodiments, the electrochemical system may be an aluminum-air electrochemical system, in which electricity is generated via electrochemical reactions in which aluminum and oxygen are electrochemically active materials. During operation of an aluminum-air system, electrons can be transferred from metallic aluminum, to the load, to the cathode, and then to oxygen. In aluminum-air electrochemical systems, aluminate ions and hydrogen gas and/or supercritical fluid may be generated as reaction products. Hydroxide ions may be shuttled between the anode and cathode, in some such systems. For example, in certain exemplary systems, the electrochemical reaction shown in Reaction A above may occur at the anode. At the cathode, oxygen and water may react to form electrons and hydroxide ions, as shown in Reaction C:

$$O_2 + 2H_2O + 4e^- \rightarrow 4OH^-$$ [C]

The electrochemically active materials in such an exemplary electrochemical system include aluminum and oxygen.

According to certain embodiments, the electrochemical system may comprise a porous medium. For example, in FIG. 1A, electrochemical system 100 comprises porous medium 130. The porous medium generally comprises a solid material within which pores are defined. As used herein, a "pore" refers to a conduit, void, or passageway, at least a portion of which is surrounded by the solid material within which the pore is formed such that a continuous loop may be drawn around the pore while remaining within the solid material within which the pore is formed. "Externally-accessible pores" are pores within the porous medium that are not completely surrounded by the solid material from which the porous medium is made, and thus, are accessible from outside the solid material from which the porous medium is made by a fluid (e.g., a liquid, gas, and/or supercritical fluid). The externally-accessible pores may be, according to certain embodiments, accessible by an electrolyte of the electrochemical system. Voids within a material that are completely surrounded by the solid material from which the porous medium is formed (and thus, not accessible from outside the porous medium, e.g. closed cells) are not externally-accessible pores. It should be understood that, in cases where the porous medium comprises an agglomeration of solid particles, pores include both the interparticle pores (i.e., those pores defined between particles when they are packed together, e.g. interstices) and intraparticle pores (i.e., those pores lying within the envelopes of the individual particles). Pores may comprise any suitable cross-sectional shape such as, for example, circular, elliptical, polygonal (e.g., rectangular, triangular, etc.), irregular, and the like.

In certain embodiments, the porous medium may provide certain advantages during operation of the electrochemical system. For example, in some embodiments, the electrochemical system may produce electricity using electrochemical reaction(s) in which a byproduct is produced that is capable of precipitating (e.g., once the byproduct becomes saturated or supersaturated in the electrolyte). In one non-limiting example, in certain cases in which the electrochemical system is an aluminum-water and/or an aluminum-air electrochemical system (e.g., as described above), the byproduct may comprise aluminate ions which are capable of precipitating to form solids (also referred to elsewhere herein as precipitates) which comprise aluminum, such as aluminum hydroxide ($Al(OH)_3$), aluminum oxide ($Al_2O_3$), and aluminum oxide hydroxide ($AlO(OH)$). In electrochemical systems without a porous medium, the byproduct may precipitate at any location within the electrochemical system, including undesirable locations such as pumps, valves, and electrochemically-active surfaces. The formation of these solid precipitates may negatively impact the performance of the electrochemical system by, for example, accumulating on system components such that their function is impaired. Thus, it may be advantageous, according to certain although not necessarily all embodiments, to control the location(s) within the electrochemical system where precipitation occurs. Incorporation of a porous medium into such a system may, according to certain embodiments, provide a surface area and/or volume in which precipitation can occur. In certain embodiments, the porous medium may be capable of inducing conditions that increase the likelihood of precipitation occurring, which may, in some cases, induce preferential precipitation on or within the porous medium (relative to other locations within the electrochemical system). In some such cases, a relatively large fraction of the total precipitation of the electrochemical reaction byproduct occurs on or within the porous medium. Thus, in certain cases, the incorporation of a porous medium may substantially improve the performance of the electrochemical system by reducing or preventing precipitation in undesired locations.

Figure 1B:
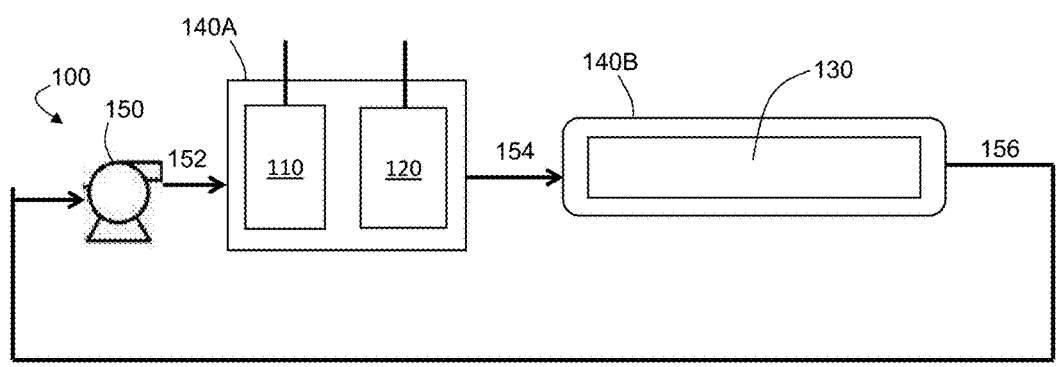
FIG. 1B is, according to some embodiments, a schematic diagram of an electrochemical system comprising multiple vessels.

In some embodiments, the electrochemical system comprises at least one vessel within which the electrodes and the porous medium are located. During operation of the electrochemical system, the electrolyte is generally also present within the vessels, in such embodiments. FIG. 1A illustrates one such embodiment, in which a single vessel 140 contains electrode 110, electrode 120, and porous medium 130. While FIG. 1A illustrates an embodiment in which the electrodes and the porous medium are contained within the same vessel, other arrangements are possible. For example, in some embodiments, the electrodes may be contained in one vessel, and the porous medium may be contained within another vessel. One example of such an embodiment is illustrated in FIG. 1B. In FIG. 1B, electrodes 110 and 120 are contained within first vessel 140A, and porous medium 130 is contained within second vessel 140B. In some such embodiments, during operation of the electrochemical system, electrolyte may be transported between the first and second vessels, for example, using a pump or other suitable electrolyte transport method. For example, in FIG. 1B, the electrochemical system comprises optional pump 150 fluidically connected to first vessel 140A via conduit 152. Pump 150 is also fluidically connected to second vessel 140B via conduit 152, first vessel 140A, and second conduit 154. Conduit 156 fluidically connects an outlet of second vessel 140B to pump 150. While the pump is illustrated as being directly upstream of the first vessel in FIG. 1B, in other cases, the pump could be positioned directly downstream of the first vessel. In some embodiments, electrolyte can be transported out of the first vessel (e.g., containing at least one electrode) into the second vessel (e.g., containing porous medium) and subsequently out of the second vessel and back into the first vessel. For example, in FIG. 1B, electrolyte can be transported out of first vessel 140A into second vessel 140B (via conduit 154) and subsequently out of second vessel back into the first vessel. (via conduits 156 and 152).

Figure 1C:
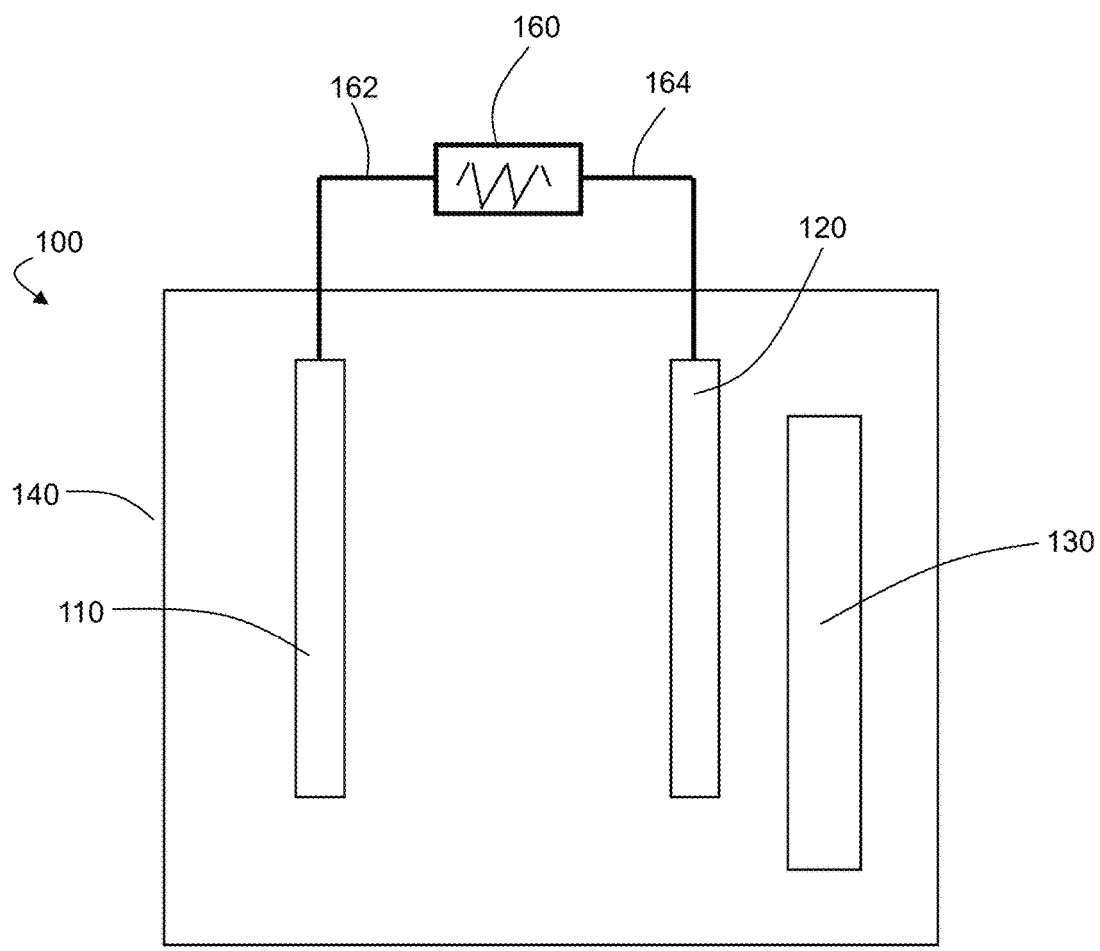
FIG. 1C is, in accordance with some embodiments, a schematic diagram of an electrochemical system coupled to an external load.
Figure 1D:
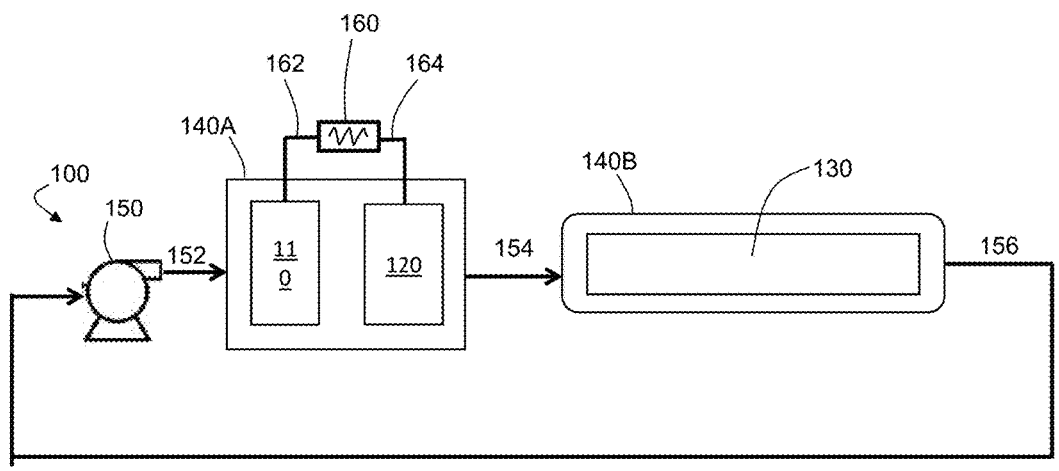
FIG. 1D is a schematic diagram of an electrochemical system comprising multiple vessels and coupled to an external load, according to certain embodiments.

In addition to the inventive systems described herein, inventive methods are also provided. According to certain embodiments, inventive methods comprise operating an electrochemical system, such as any of the electrochemical systems described elsewhere herein. Operating the electrochemical system, according to certain embodiments, can include allowing at least one electrochemical reaction to proceed within the electrochemical system. In some such embodiments, the electrochemical reaction(s) can generate electrical current. The electrical current can be used to power an external load that is electrically coupled to the electrochemical system. For example, referring to FIGS. 1C and 1D, external electrical load 160 can be coupled to the electrochemical system (e.g., using electrical leads 162 and 164) such that the electrical current generated by the electrochemical system powers the external electrical load. According to certain embodiments, while the electrochemical reaction(s) proceed within the electrochemical system, the electrochemical reaction(s) can generate at least one reaction product, which may form all or part of a precipitate within the electrochemical system, as described in more detail below.

According to certain embodiments, inventive methods comprise transporting an electrolyte of an electrochemical system through a porous medium. The electrolyte may be transported through the porous medium, according to some such embodiments, during operation of the electrochemical system. Generally, the electrolyte of the electrochemical system comprises a fluid (e.g., a gas, a liquid, and/or a supercritical fluid) which acts as a medium for the storage and/or transport of ions that participate in the electrochemical reaction(s) of the electrochemical system. According to certain embodiments, the electrolyte comprises a liquid and/or a supercritical fluid (e.g., liquid water and/or supercritical water, such as liquid or supercritical aqueous solutions). In some cases, the electrolyte fluid can also function as an electrochemically active material. For example, in certain embodiments in which the electrochemical system comprises an aluminum-water and/or an aluminum-air electrochemical system (e.g., examples of which are described above), water may function as both an electrolyte (e.g., facilitating the transport of hydroxide ions between anode and cathode) and as an electrochemically active material (e.g., reacting with electrons at the cathode, for example, as shown in Reactions B and C). Additional details regarding electrolytes that may be used in certain inventive embodiments (including both systems and methods) are provided below and elsewhere herein.

Figure 2:
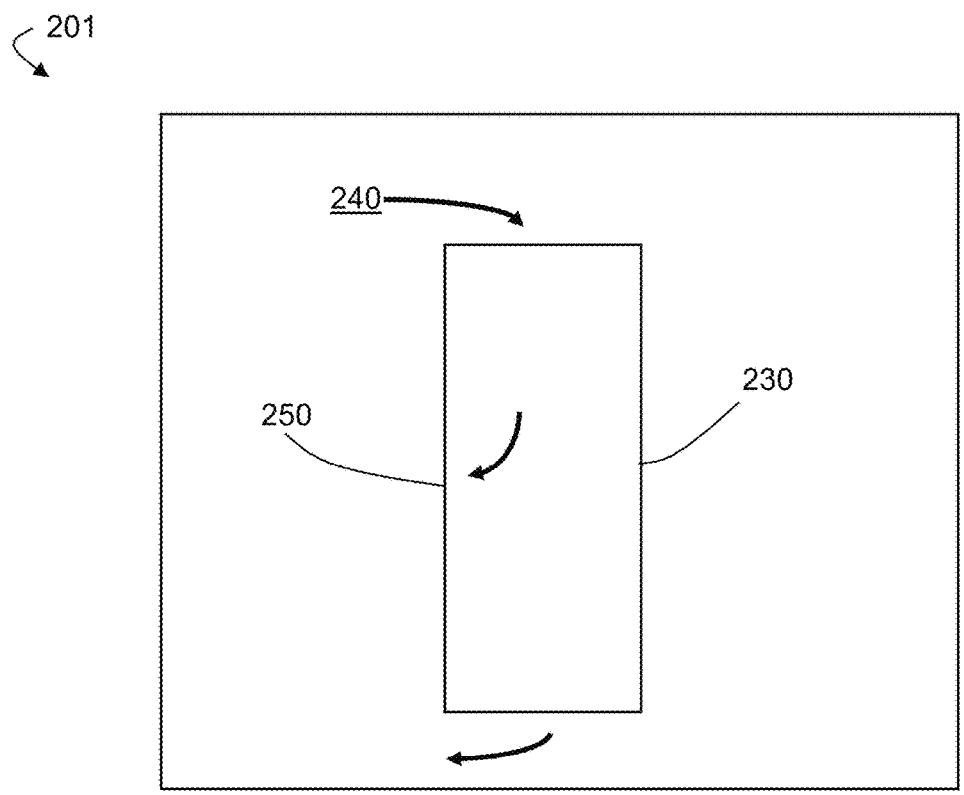
FIG. 2 is, according to certain embodiments, a schematic diagram illustrating the transport of electrolyte through a porous medium.

Transporting the electrolyte through the porous medium may be achieved using a variety of mechanisms and/or apparatus, suitable non-limiting examples of which are described in more detail below and elsewhere herein. According to certain embodiments, transportation of the electrolyte through the porous medium comprises flowing the electrolyte such that the electrolyte travels from one outer boundary of the porous medium, through at least one pore of the porous medium, and out a second outer boundary of the porous medium. The second outer boundary may be opposite the first outer boundary, according to certain embodiments. FIG. 2 shows one example of an inventive method, in which electrochemical system 201 is operated such that electrolyte 240 is transported through porous medium 230.

As noted above, the electrochemical reaction(s) within the electrochemical system can produce one or more byproducts. These byproducts may accumulate within the electrolyte during operation of the electrochemical system (e.g., in the form of aluminate in certain aluminum-water and/or aluminum-air electrochemical systems). Certain inventive methods are related to precipitating one or more products of an electrochemical reaction of the electrochemical system on or within a porous medium of the electrochemical system. In some embodiments, a solid comprising aluminum may be precipitated on a surface of the porous medium. According to certain embodiments, at least a portion of the aluminum within the solid originates from a product of an electrochemical reaction carried out within the electrochemical system. As described above, this may take the form of solids such as aluminum hydroxide ($Al(OH)_3$), aluminum oxide ($Al_2O_3$), and/or aluminum oxide hydroxide ($AlO(OH)$) in the cases of certain aluminum-water electrochemical systems and/or aluminum-air electrochemical systems. FIG. 2 shows one exemplary embodiment of such a method, in which solid 250 is precipitated from electrolyte 240 on the surface of porous medium 230. Solid 250 may comprise, according to certain embodiments, a byproduct of the electrochemical reaction(s) used to generate electrical current in the electrochemical system. For example, solid 250 may comprise aluminum that originates from an electrochemically active material (e.g., metallic aluminum). In some embodiments, solid 250 comprises aluminum hydroxide ($Al(OH)_3$), aluminum oxide ($Al_2O_3$), and/or aluminum oxide hydroxide ($AlO(OH)$).

According to certain embodiments, inventive methods of collecting aluminate waste are described. The inventive methods of collecting aluminate waste described herein may, according to certain embodiments, make use of any of the electrochemical systems described elsewhere herein. According to certain embodiments, the aluminate waste may be, for example, a byproduct of an electrochemical reaction within an electrochemical system (e.g., an electrochemical system comprising an electrochemically active material comprising aluminum, as might be present in an aluminum-air or an aluminum-water electrochemical system). In some embodiments, the aluminate waste may be part of an electrolyte. For example, in some embodiments, a super-saturated aluminate waste stream can be part of an electrolyte.

According to certain embodiments, the externally-accessible pores of the porous medium each have a pore volume, and the externally-accessible pores together define an externally-accessible pore volume of the porous medium. Generally, the externally-accessible pore volume of the porous medium can be thought of as the volume within the porous medium that is capable of being occupied by a fluid (e.g., an electrolyte of the electrochemical system). The externally-accessible pore volume of a given porous medium may be determined by using a water displacement test. Such a test may be performed as follows. First, the porous medium is added to a vessel containing an initial known volume of water taking care to ensure that bubbles are not entrained in the externally-accessible pores of the porous medium. The combined volume of the porous medium and the water is then measured. A displacement volume is then determined by subtracting the initial known volume of water from the combined volume of the porous medium and the water. The externally-accessible pore volume is then determined by subtracting the displacement volume from the geometric volume of the porous medium. The "geometric volume" of a structure corresponds to the volume that is bound by the external geometric surfaces of the structure. The "geometric surfaces" of a structure correspond to the surfaces defined by the outer boundaries of the structure, and do not include the internal surface area (e.g., area within pores of a porous structure). Generally, for structures that can be viewed without the aid of magnification, the dimensions of geometric surfaces and geometric volumes can be measured using macroscopic measuring tools (e.g., a ruler, etc.). Similar measurements can be made for smaller structures with the aid of suitable magnification tools.

In certain embodiments, the externally-accessible pore volume of the porous medium may make up a relatively large percentage of the electrolyte-accessible volume of the electrochemical system. The electrolyte-accessible volume of an electrochemical system refers to the volume within the electrochemical system that is capable of being occupied by an electrolyte of the electrochemical system. The electrolyte-accessible volume of a given electrochemical system includes the externally-accessible volume within the porous medium as well as the remaining volume of the electrochemical system that can be occupied by the electrolyte.

The electrolyte-accessible volume of an electrochemical system may be determined as follows. First, the porous medium is removed from the electrochemical system. Next, water is added to the electrochemical system such that the water occupies all of the volume that is able to be occupied by the electrolyte during the operation of the electrochemical system as well as the void left behind by the removal of the solid component of the porous medium. For example, in the case where the electrodes and porous medium are contained within a single vessel during operation of the electrochemical system, the porous medium would be removed from the vessel (while the electrodes remain), and water would be added until the vessel is filled. As another example, in the case where the electrodes are contained within a first vessel and the porous medium is contained within a second vessel during operation of the electrochemical system, the porous medium would be removed from the second vessel (while the electrodes remain in the first vessel), and water would be added until the first and second vessels, and any conduits connecting the first and second vessels that could be filled by electrolyte during operation, are filled. The electrolyte-accessible volume of the electrochemical system ($V_{EA,system}$) is then calculated as follows:

$$V_{EA,system} = V_{added\ water} - V_{PM,geom} + V_{EA,pm} \quad [1]$$

where $V_{added\ water}$ corresponds to the volume of water that is added to the electrochemical system such that the water occupies all of the volume that is able to be occupied by the electrolyte during the operation of the electrochemical system as well as the void left behind by the removal of the solid component of the porous medium; $V_{PM,geom}$ is the geometric volume of the porous medium (calculated as described above); and $V_{EA,pm}$ is the externally-accessible pore volume of the porous medium (calculated as described above).

According to certain embodiments, the externally-accessible pore volume of the porous medium may make up a relatively large percentage of the electrolyte-accessible volume of the electrochemical system. This percentage is calculated by dividing the externally-accessible pore volume of the porous medium by the electrolyte-accessible volume of the electrochemical system and multiplying the result by 100%, as shown in Equation 2 below:

$$\text{Percentage} = \frac{V_{EA,pm}}{V_{EA,system}} \times 100\%. \quad [2]$$

In some embodiments, the externally-accessible pore volume of the porous medium makes up at least 5%, at least 10%, at least 25%, at least 50%, or at least 75% of the electrolyte-accessible volume of the electrochemical system. In certain embodiments, the externally-accessible pore volume of the porous medium makes up up to 25%, up to 50%, up to 75%, up to 90%, up to 95%, or more of the electrolyte-accessible volume of the electrochemical system. Combinations of the above-referenced ranges are also possible (e.g., at least 5% and up to 95%, etc.). Other ranges are also possible. As described further below, it should also be understood that the ranges above may apply to the porous medium in any state. For example, in some embodiments, the externally-accessible pore volume of the porous medium may make up a percentage of the electrolyte-accessible volume of the electrochemical system within any of these ranges prior to use (e.g., prior to first use) of the electrochemical system and/or during at least one point in time during operation of the electrochemical system (e.g., when the externally-accessible pore volume of the porous medium contains electrolyte during operation of the electrochemical system). In some embodiments, the externally-accessible pore volume of the porous medium may make up a percentage of the electrolyte-accessible volume of the electrochemical system within any of these ranges when the porous medium is strained or unstrained (e.g., compressed or uncompressed), wet or dry.

In some embodiments, the externally-accessible surface area of the porous medium may constitute a relatively large percentage of the surface area that is accessible by the electrolyte during operation of the electrochemical system. The externally-accessible surface area of the porous medium generally refers to the total surface area of the solid material from which the porous medium is made that can be contacted by an external fluid (e.g., the electrolyte during operation of the electrochemical system). The externally-accessible surface area of the porous medium may be determined using Brunauer-Emmett-Teller (BET) Theory. Briefly, a gas is introduced such that it is physisorbed onto the accessible surfaces of the porous medium in a monolayer isothermally (e.g. $N_2$ at its boiling point, $-195.79°$ C.). The resultant adsorption isotherm yields a linear relationship, termed a BET plot, that is a function of the equilibrium pressure (p), saturation pressure ($p_0$), the mass, and the heat of adsorption of the physisorbed gas so long as the ratio $p/p_0$ is greater than 0.05 and less than 0.35. With the linear regression coefficients from the BET plot, the externally-accessible surface area ($SA_{ea}$) of the porous medium can then be determined as follows:

$$SA_{ea} = \frac{v_m Ns}{V} \quad [3]$$

where $v_m$ is the volume of the monolayer of physisorbed material, N is Avogadro's number ($6.023 \times 10^{23}$), s is the adsorption cross section of the physisorbed material (e.g., 16.2 square Angstroms when $N_2$ gas is used), and V is the molar volume of the adsorbate gas.

In certain embodiments, the externally-accessible surface area of the porous medium may make up a relatively high percentage of the electrolyte-accessible surface area of the electrochemical system. The electrolyte-accessible surface area of an electrochemical system refers to the surface area of the solid surfaces within the electrochemical system that are capable of being occupied by an electrolyte of the electrochemical system. The electrolyte-accessible surface area of a given electrochemical system includes the externally-accessible surface area of the porous medium as well as the remaining surface area of the solid surfaces of the electrochemical system that can be occupied by the electrolyte. The electrolyte-accessible surface area of an electrochemical system may be determined using Brunauer-Emmett-Teller (BET) Theory, as described above, to determine the surface area of solid surfaces within the electrochemical system that the electrolyte is capable of contacting during operation of the electrochemical system (e.g., the solid surfaces of the electrodes, the porous medium, internal surfaces of the vessel(s) of the electrochemical system, etc.).

According to certain embodiments, the externally-accessible surface area of the porous medium may make up a relatively large percentage of the electrolyte-accessible surface area of the electrochemical system. This percentage is calculated by dividing the externally-accessible surface area of the porous medium ($SA_{EA,pm}$) by the electrolyte-accessible surface area of the electrochemical system ($SA_{EA,system}$) and multiplying the result by 100%, as shown in Equation 4 below:

$$\text{Percentage} = \frac{SA_{EA,pm}}{SA_{EA,system} - SA_{EA,electrodes}} \times 100\%. \qquad [4]$$

In some embodiments, the externally-accessible surface area of the porous medium makes up at least 5%, at least 10%, at least 25%, at least 50%, or at least 75% of the electrolyte-accessible surface area of the electrochemical system. In certain embodiments, the externally-accessible surface area of the porous medium makes up up to 25%, up to 50%, up to 75%, up to 90%, up to 95%, or more of the electrolyte-accessible surface area of the electrochemical system. Combinations of the above-referenced ranges are also possible (e.g., at least 5% and up to 95%, etc.). Other ranges are also possible. As described further below, it should also be understood that the ranges above may apply to the porous medium in any state. For example, in some embodiments, the externally-accessible surface area of the porous medium may make up a percentage of the electrolyte-accessible surface area of the electrochemical system within any of these ranges prior to use (e.g., prior to first use) of the electrochemical system and/or during at least one point in time during operation of the electrochemical system (e.g., when the externally-accessible pore volume of the porous medium contains electrolyte during operation of the electrochemical system). In some embodiments, the externally-accessible surface area of the porous medium may make up a percentage of the electrolyte-accessible surface area of the electrochemical system within any of these ranges when the porous medium is strained or unstrained (e.g., compressed or uncompressed), wet or dry.

According to certain embodiments, the externally-accessible surface area of the porous medium may makes up a relatively large percentage of the electrolyte-accessible surface area of the electrochemical system that is accessible by an electrolyte, excluding the electrolyte-accessible surface area of the electrodes. This percentage is calculated by dividing the externally-accessible surface area of the porous medium ($SA_{EA,pm}$) by the difference between the electrolyte-accessible surface area of the electrochemical system ($SA_{EA,system}$) and the electrolyte-accessible surface area of the electrodes ($SA_{EA,electrodes}$), as shown in Equation 5 below:

$$\text{Percentage} = \frac{SA_{EA,pm}}{SA_{EA,system} - SA_{EA,electrodes}} \times 100\%. \qquad [5]$$

The electrolyte-accessible surface area of the electrodes can be determined using Brunauer-Emmett-Teller (BET) Theory, as described above.

In some embodiments, the externally-accessible surface area of the porous medium makes up at least 5%, at least 10%, at least 25%, at least 50%, or at least 75% of the electrolyte-accessible surface area of the electrochemical system, excluding the electrolyte-accessible surface area of the electrodes. In certain embodiments, the externally-accessible surface area of the porous medium makes up up to 25%, up to 50%, up to 75%, up to 90%, up to 95%, or more of the electrolyte-accessible surface area of the electrochemical system, excluding the electrolyte-accessible surface area of the electrodes. Combinations of the above-referenced ranges are also possible (e.g., at least 5% and up to 95%, etc.). Other ranges are also possible. As described further below, it should also be understood that the ranges above may apply to the porous medium in any state. For example, in some embodiments, the externally-accessible surface area of the porous medium may make up a percentage of the electrolyte-accessible surface area of the electrochemical system within any of these ranges prior to use (e.g., prior to first use) of the electrochemical system and/or during at least one point in time during operation of the electrochemical system (e.g., when the externally-accessible pore volume of the porous medium contains electrolyte during operation of the electrochemical system). In some embodiments, the externally-accessible surface area of the porous medium may make up a percentage of the electrolyte-accessible surface area of the electrochemical system within any of these ranges when the porous medium is strained or unstrained (e.g., compressed or uncompressed), wet or dry.

In accordance with certain embodiments, the porous medium may be capable of undergoing a change in geometric volume prior to and/or during operation of the electrochemical system. (The determination of the geometric volume of a porous medium is described above.)

For example, in some embodiments, the porous medium may be deformable. The term "deformable" generally refers to the ability of a material to change in size and/or shape while remaining substantially intact (i.e., such that at least 85 wt %, at least 90 wt %, at least 95 wt %, or at least 99 wt % of the material remains intact). In certain embodiments, the porous medium may be sufficiently deformable such that a force can be used to alter a length of a dimension of the porous medium by at least 5% (or at least 10%, at least 20%, or at least 50%) relative to the original length of the dimension while the porous medium remains substantially intact (i.e., such that at least 85 wt %, at least 90 wt %, at least 95 wt %, or at least 99 wt % of the porous medium remains intact). In some such embodiments, the porous medium may exhibit these degrees of deformability after it has been subject to a compressive force that reduces at least one dimension of the porous medium. In some such embodiments, the porous medium may exhibit these degrees of deformability after it has been subject to a tensile force that lengthens at least one dimension of the porous medium.

In certain embodiments, the porous medium may be elastic. The term "elastic" generally refers to the ability of a material to substantially return to its original shape spontaneously after contraction, dilatation, or distortion from its original shape. In some embodiments, the porous medium may be elastic such that a compressive force may be applied and, after the compressive force is removed, the porous medium may return to, substantially, its original shape and size. In certain embodiments, the porous medium may be sufficiently elastic such that a force can be used to alter a length of a dimension of the porous medium by at least 5% (or at least 10%, at least 20%, or at least 50%) relative to the original length of the dimension, and after the force is removed, the dimension of the porous medium will spontaneously return to a value that is within 5% (or within 2%, within 1%, or within 0.1%) of its original value. In some such embodiments, the porous medium may exhibit these elasticities after it has been subject to a compressive force that reduces at least one dimension of the porous medium. In some such embodiments, the porous medium may exhibit these elasticities after it has been subject to a tensile force that lengthens at least one dimension of the porous medium.

To illustrate, a force is said to alter a length of a dimension by at least 5% when, after the force is applied, the dimension is reduced to a value that is 0.95 times its original value or less or if the dimension is increased to a value that is 1.05 times its original value or more. Also, after the force is removed, the length of a dimension is said to spontaneously return to a value that is within 5% of its original value when, after the force is removed and without the application of other forces, the length of the dimension returns to a value that is between 0.95 and 1.05 times the original length of the dimension. It should be understood that the use of an elastic porous medium is not required, and in other embodiments, the porous medium is inelastic.

The porous medium may be deformable and/or elastic, for example, when the solid component of the porous medium is made from a material that is sufficiently deformable and/or elastic that it allows for compression and/or expansion (and, in the case of elasticity, re-expansion and/or re-compression) of the porous medium. Examples of such materials include, but are not limited to, polyesters, polyethers, polypropylene, polyacrylics, polystyrenes, acrylonitrile butadiene styrene, poly(tetrafluoroethylene) (e.g., Teflon®), and/or blends of two or more of these. According to certain embodiments, the use of a porous medium that has a relatively high porosity (e.g., a relatively highly porous foam, a relatively highly porous prismatic medium) can impart further deformability and/or elasticity than would be observed at lower porosity levels. One of ordinary skill in the art, given the present disclosure, would be capable of selecting suitable materials and configurations to impart the desired deformability and/or elasticity with no more than routine experimentation.

In certain cases, the porous medium may be under one or more compressive forces that renders the geometric volume of the porous medium smaller than the geometric volume the porous medium would have in the absence of the compressive force(s). A change in the geometric volume of the porous medium could also occur, in some embodiments, when the porous medium is wetted (e.g., with a liquid and/or a supercritical fluid). For example, in certain embodiments, the porous medium may have a first, relatively small geometric volume when it is dry and a second, relatively large geometric volume when it is wetted (e.g., when the pores of the porous medium are infiltrated by an electrolyte). For example, in some cases, the interaction between the surfaces of the porous medium and the liquid and/or supercritical fluid can produce changes in surface forces (relative to the surface forces present at the surfaces of the porous medium before it is wetted) that expand the geometric volume of the porous medium. Such behavior can be observed, for example, when the solid material from which the porous medium is made has a hydrophilicity or hydrophobicity that is similar to that of the liquid that infiltrates the pores of the porous medium (e.g., the liquid of the electrolyte). For example, in the case of a water-containing electrolyte that infiltrates the pores of the porous medium, the presence of polar functional groups on or within the solid material from which the porous medium is made can lead to the expansion of the geometric volume of the porous medium. Examples of materials that can interact with water, according to certain embodiments, such that expansion of the geometric volume of the porous medium is observed include, but are not limited to polyesters, polyethers, polyacrylics, acrylonitrile butadiene styrene, and/or blends of two or more of these.

In some embodiments, the porous medium may occupy a geometric volume prior to use (e.g., prior to first use) that is less than the geometric volume occupied by the porous medium during use. For example, in some cases, the porous medium may be under a compressive force prior to use (e.g., prior to first use). In some such cases, the compressive force may be reduced or removed prior to or during use (e.g., by rupturing, removing, or otherwise eliminating the source of the compressive force, such as a constricting band, a constricting film, a spring, or other source of the compressive force) such that, after the compressive force is reduced or removed, the porous medium expands in volume. As another example, in some cases, the porous medium may be dry prior to use (e.g., prior to first use). In some such cases, the porous medium may be wetted prior to or during use (e.g., by exposing the porous medium to a liquid and/or supercritical fluid, such as an electrolyte) such that, after the porous medium has been wetted, the porous medium expands in volume.

In some embodiments, the porous medium may be capable of occupying a first geometric volume when it is in a strained state (e.g., a compressed state) and a second geometric volume when it is in an unstrained state (e.g., an uncompressed state). The geometric volume of the porous medium when it is in an unstrained state can be determined by measuring the geometric volume of the porous medium when it is not subject to any external stresses, but rather, is allowed to remain at a steady mechanical state within the ambient environment. According to some embodiments, the geometric volume of the porous medium may be smaller when it is under a strained state (e.g., under a compressive force) than when it is in the unstrained state. In accordance with certain embodiments, the porous medium may be compressed prior to use such that it occupies a substantially smaller geometric volume than it does in the unstrained state. FIG. 3A is an exemplary schematic illustration of a porous medium 230 when the porous medium is in a first state under a compressive force (represented by arrows 232). In FIG. 3B, on the other hand, porous medium 230 is not subject to the compressive force illustrated in FIG. 3A, and thus, porous medium 230 in FIG. 3B occupies a larger geometric volume than is occupied by porous medium 230 in FIG. 3A.

In some embodiments, the porous medium may undergo a change from a first state comprising a first geometric volume to a second state comprising a second geometric volume, wherein both the first state and the second state are unstrained states. In some such embodiments, the first state corresponds to the state of the porous medium prior to use, and the second state corresponds to the state of the porous medium when it is expanded for use. In some such embodiments, the porous medium can be expanded for use by wetting the porous medium with a fluid, such as the electrolyte of the electrochemical system. FIGS. 3C-3D are schematic diagrams illustrating one such example. In FIG. 3C, porous medium 230 corresponds to a dry porous medium prior to placement within the electrochemical system (and prior to wetting the porous medium with the electrolyte of the electrochemical system). In FIG. 3D, porous medium 230 has been placed within (and has been wetted by) the electrolyte 240 of the electrochemical system, causing the geometric volume of the porous medium to expand.

In some embodiments, the porous medium may occupy a geometric volume in an unstrained state that is less than the geometric volume occupied by the medium during use. For example, according to certain embodiments, an elastic porous medium may be stored within a small geometric volume prior to use (e.g., prior to first use) and then mechanically stretched (e.g., prior to use (e.g., prior to first use and/or during use) to occupy a larger geometric volume.

The geometric volume of the porous medium in its non-expanded state (e.g., prior to use (e.g., prior to first use), prior to wetting) may be substantially smaller, according to certain embodiments, than the geometric volume of the porous medium in its expanded state (e.g., during use, after wetting, after removal of an externally applied strain). In some embodiments, the geometric volume of the porous medium in its non-expanded state (e.g., prior to use (e.g., prior to first use), prior to wetting) is less than or equal to 80%, less than or equal to 60%, or less than or equal to 40% of the geometric volume of the porous medium in its expanded state (e.g., during use, after wetting, after removal of an externally applied strain). In some embodiments, the geometric volume of the porous medium in its non-expanded state (e.g., prior to use (e.g., prior to first use), prior to wetting) is at least 5%, at least 10%, or at least 20% of the geometric volume of the porous medium in its expanded state (e.g., during use, after wetting, after removal of an externally applied strain). Combinations of these ranges are also possible (e.g., at least 5% and less than or equal to 80%). Other ranges are also possible.

In some embodiments, the porous medium may be capable of undergoing expansion during electrochemical system operation. For example, in some embodiments, the electrochemical system may be operated such that the porous medium expands as needed, in whole or in part. In some embodiments, expansion of the porous medium may comprise automated expansion and/or manual expansion. According to certain embodiments, expansion of the porous medium may occur based upon physical and/or chemical reactions that occur during electrochemical system operation. Non-limiting examples include exposure of the porous medium to the electrolyte, precipitation of electrochemical reaction products on the porous medium, change in pH of the electrolyte, change in pressure of the electrochemical system, and change in temperature of the electrochemical system. One method that could be used to accomplish this expansion, according to certain embodiments, is to pump electrolyte or water into a vacuum-sealed plastic bag containing the porous media in whole or in part.

As one non-limiting illustrative example, in some embodiments, the porous medium is stored in a compressed state, after which all of the porous medium is expanded (e.g., at the start of operation of the electrochemical system and/or when the electrolyte (e.g., water) is added to the electrochemical system).

As another non-limiting illustrative example, in some embodiments, the porous medium is stored in a compressed state, after which some (but not all) of the porous medium is expanded. The expanded portion of the porous medium can collect precipitate during operation. In some such embodiments, after the first expanded portion of the porous medium has collected precipitate (e.g., when the externally-accessible pores of the first expanded portion are at least 50%, at least 75%, or at least 90% occupied by precipitate), a second portion of the porous medium can be expanded and used to collect new precipitate. In some such embodiments, after the second expanded portion of the porous medium has collected precipitate (e.g., when the externally-accessible pores of the second expanded portion are at least 50%, at least 75%, or at least 90% occupied by precipitate), a third portion of the porous medium can be expanded and used to collect new precipitate. In some embodiments, the compressed portions of porous media can be stored and expanded in discrete units (e.g., discrete volumes of foam that are individually compressed, for example, using a vacuum package, constricting band, or other source of force). In other embodiments, the compressed portions of porous media can be expanded in a more continuous fashion. In some such embodiments, used media that has been at least partially filled with precipitate (e.g., such that the externally-accessible pores of the porous media are at least 50%, at least 75%, or at least 90% occupied by precipitate) can be, for example, jettisoned from the electrochemical system or stored within the electrochemical system.

The properties of the porous medium described above may apply to the porous medium in any state (e.g., prior to use (e.g., prior to first use) of the electrochemical system, during at least one point in time during operation of the electrochemical system, when the porous medium is strained or unstrained (e.g., compressed or uncompressed), and/or when the porous medium is wet or dry).

In some embodiments, the porous medium may be relatively large. For example, in some embodiments, the porous medium may occupy a geometric volume of greater than or equal to 1 $cm^3$, greater than or equal to 10 $cm^3$, greater than or equal to 100 $cm^3$, greater than or equal to 1,000 $cm^3$, or greater than or equal to 10,000 $cm^3$. In certain embodiments, the porous medium may occupy a geometric volume of less than or equal to 1 $m^3$, less than or equal to 10,000 $cm^3$, less than or equal to 1,000 $cm^3$, less than or equal to 100 $cm^3$, or less than or equal to 10 $cm^3$. Combinations of the above-referenced ranges are also possible (e.g., greater than or equal to 1 $cm^3$ and less than or equal to 10 $cm^3$). Other ranges are also possible. The porous medium may occupy any of the geometric volumes described above in any state (e.g., prior to use (e.g., prior to first use) of the electrochemical system, during at least one point in time during operation of the electrochemical system, when the porous medium is strained or unstrained (e.g., compressed or uncompressed), and/or when the porous medium is wet or dry). In some embodiments, the porous medium occupies any of the geometric volumes described above during at least one point in time during operation of the electrochemical system.

The pores within the porous medium may have a variety of suitable sizes. In some embodiments, the porous medium may include at least some pores (e.g., externally-accessible pores) having maximum cross-sectional dimensions of greater than or equal to 1 micrometer, greater than or equal to 2.5 micrometers, greater than or equal to 5 micrometers, greater than or equal to 10 micrometers, greater than or equal to 50 micrometers, greater than or equal to 100 micrometers, greater than or equal to 500 micrometers, greater than or equal to 1 mm, or greater than or equal to 1 cm. In some embodiments, the porous medium may include at least some pores (e.g. at least some externally-accessible pores) having maximum-cross sectional dimensions of less than or equal to 10 cm, less than or equal to 5 cm, less than or equal to 1 cm, less than or equal to 1 mm, less than or equal to 500 micrometers, or less than or equal to 100 micrometers. Combinations of the above-referenced ranges are also possible (e.g., greater than or equal to 1 micrometer and less than or equal to 10 cm). Other ranges are also possible. For a given pore, the maximum cross-sectional dimension of the pore corresponds to the longest distance that extends from one wall of the pore to an opposing wall of the pore, perpendicular to the length of the pore Those of ordinary skill in the art would understand that the length of a given pore corresponds to the dimension of the pore that extends between the point at which fluid would enter the pore and the opposing end of the pore (which could be, for example, the point at which fluid would exit the pore when fluid is transported from one end of the pore to another end of the pore). The ranges above may apply to the porous medium in any state (e.g., prior to use (e.g., prior to first use) of the electrochemical system, during at least one point in time during operation of the electrochemical system, when the porous medium is strained or unstrained (e.g., compressed or uncompressed), and/or when the porous medium is wet or dry). In some embodiments, the porous medium includes at least some pores (e.g., externally-accessible pores) having the properties described above during at least one point in time during operation of the electrochemical system.

The average pore diameter of the porous medium may have a number of suitable values, according to various embodiments. The average pore diameter of a porous medium may be determined, for example, by intrusion porosimetry. Briefly, this procedure entails intruding a non-wetting, high surface tension liquid (e.g., mercury) at a known pressure through the porous medium. The average pore diameter ($D_P$) can then be calculated from relating the experimental measurements through Washburn's equation:

$$P_L - P_G = -4\sigma \cos \theta / D_P \qquad [6]$$

where $P_L$ is the pressure of the liquid (e.g., mercury), $P_G$ is the pressure of the gas (e.g., zero when performed in an evacuated chamber), σ is the surface tension of the liquid (e.g., approximately 480 mN/m for mercury at 20° C.), and θ is the contact angle of the intrusion liquid (e.g. approximately 140° for mercury). In some embodiments, the average pore diameter of the externally-accessible pores of the porous medium may be greater than or equal to 1 micrometer, greater than or equal to 2.5 micrometers, greater than or equal to 5 micrometers, greater than or equal to 10 micrometers, greater than or equal to 50 micrometers, greater than or equal to 100 micrometers, greater than or equal to 500 micrometers, greater than or equal to 1 mm, or greater than or equal to 1 cm. In some embodiments, the average pore diameter of the externally-accessible pores of the porous medium may be less than or equal to 10 cm, less than or equal to 5 cm, less than or equal to 1 cm, less than or equal to 1 mm, less than or equal to 500 micrometers, or less than or equal to 100 micrometers. Combinations of the above-referenced ranges are also possible (e.g., greater than or equal to 1 micrometer and less than or equal to 10 cm). Other ranges are also possible. The ranges above may apply to the porous medium in any state (e.g., prior to use (e.g., prior to first use) of the electrochemical system, during at least one point in time during operation of the electrochemical system, when the porous medium is strained or unstrained (e.g., compressed or uncompressed), and/or when the porous medium is wet or dry). In some embodiments, the ranges above apply to the porous medium during at least one point in time during operation of the electrochemical system.

According to certain embodiments, at least 50%, at least 75%, at least 90%, at least 95%, or at least 99% of the cumulative volume of the externally-accessible pores within the porous medium is made up of pores having diameters of greater than or equal to 1 micrometer, greater than or equal to 2.5 micrometers, greater than or equal to 5 micrometers, greater than or equal to 10 micrometers, greater than or equal to 50 micrometers, greater than or equal to 100 micrometers, greater than or equal to 500 micrometers, greater than or equal to 1 mm, or greater than or equal to 1 cm. In some embodiments, at least 50%, at least 75%, at least 90%, at least 95%, or at least 99% of the cumulative volume of the externally-accessible pores within the porous medium is made up of pores having diameters of less than or equal to 10 cm, less than or equal to 5 cm, less than or equal to 1 cm, less than or equal to 1 mm, less than or equal to 500 micrometers, or less than or equal to 100 micrometers. Combinations of the above-referenced ranges are also possible (e.g., greater than or equal to 1 micrometer and less than or equal to 10 cm). The ranges above may apply to the porous medium in any state (e.g., prior to use (e.g., prior to first use) of the electrochemical system, during at least one point in time during operation of the electrochemical system, when the porous medium is strained or unstrained (e.g., compressed or uncompressed), and/or when the porous medium is wet or dry). In some embodiments, the ranges above apply to the porous medium during at least one point in time during operation of the electrochemical system.

According to certain embodiments, the externally-accessible pores within the porous medium are elongated. In some embodiments, at least some (e.g., at least 25%, at least 50%, at least 75%, at least 90%, at least 95% at least 99%, or more) of the externally-accessible pores within the porous medium have an aspect ratio of at least 5, at least 10, at least 50, at least 100, at least 1000, or greater. In some embodiments, at least some (e.g., at least 25%, at least 50%, at least 75%, at least 90%, at least 95% at least 99%, or more) of the volume occupied by the externally-accessible pores within the porous medium is occupied by pores having an aspect ratio of at least 5, at least 10, at least 50, at least 100, at least 1000, or greater.

In some embodiments, the externally-accessible pores may make up a relatively large percentage of the geometric volume of the porous medium. For example, in some embodiments, at least 50%, at least 70%, at least 80%, at least 90%, at least 95%, at least 98%, or more of the geometric volume of the porous medium is made up of externally-accessible pores. Other ranges are also possible. For example, in some embodiments, at least 5%, at least 10%, or at least 25% of the geometric volume of the porous medium is made up of externally-accessible pores. The externally-accessible pores may make up any of the percentages of the geometric volume of the porous medium described above in any state (e.g., prior to use (e.g., prior to first use) of the electrochemical system, during at least one point in time during operation of the electrochemical system, when the porous medium is strained or unstrained (e.g., compressed or uncompressed), and/or when the porous medium is wet or dry). In some embodiments, the externally-accessible pores make up any of the percentages of the geometric volume of the porous medium described above during at least one point in time during operation of the electrochemical system.

The porous medium may assume a variety of forms. In certain embodiments, the porous medium comprises a solid material having a percolated pore network that allows for the transport of a fluid from one external geometric surface of the porous medium, through the porous medium, to another external geometric surface of the porous medium. For example, in some cases, the pore network within the porous medium may allow for the transport of fluid from a first external geometric surface, through the porous medium, and out of the porous medium via a second geometric surface that is opposite the first geometric surface. In some embodiments, the porous medium can be configured such that fluid may be transported from outside the porous medium through the bulk of the porous medium. In certain embodiments, the porous medium can be configured such that at least some fluid may be transported from outside the porous medium through at least one location that is within the inner 75%, within the inner 50%, within the inner 40%, within the inner 30%, within the inner 20%, within the inner 10%, or within the inner 5% of the geometric volume of the porous medium. One can determine whether a location is "within the inner X %" of the geometric volume of a porous medium by drawing a line segment from the geometric center of the geometric volume, through the location in question, and outward to the edge of the geometric volume. If the location in question falls within the X % of the line nearest the geometric center of the geometric volume, the location would be said to fall "within the inner X %" of the geometric volume. Taking 75% as an example, if the location in question falls within the 75% of the line segment nearest the geometric center of the geometric volume, the location would be said to fall within the inner 75% of the geometric volume.

Figure 4:
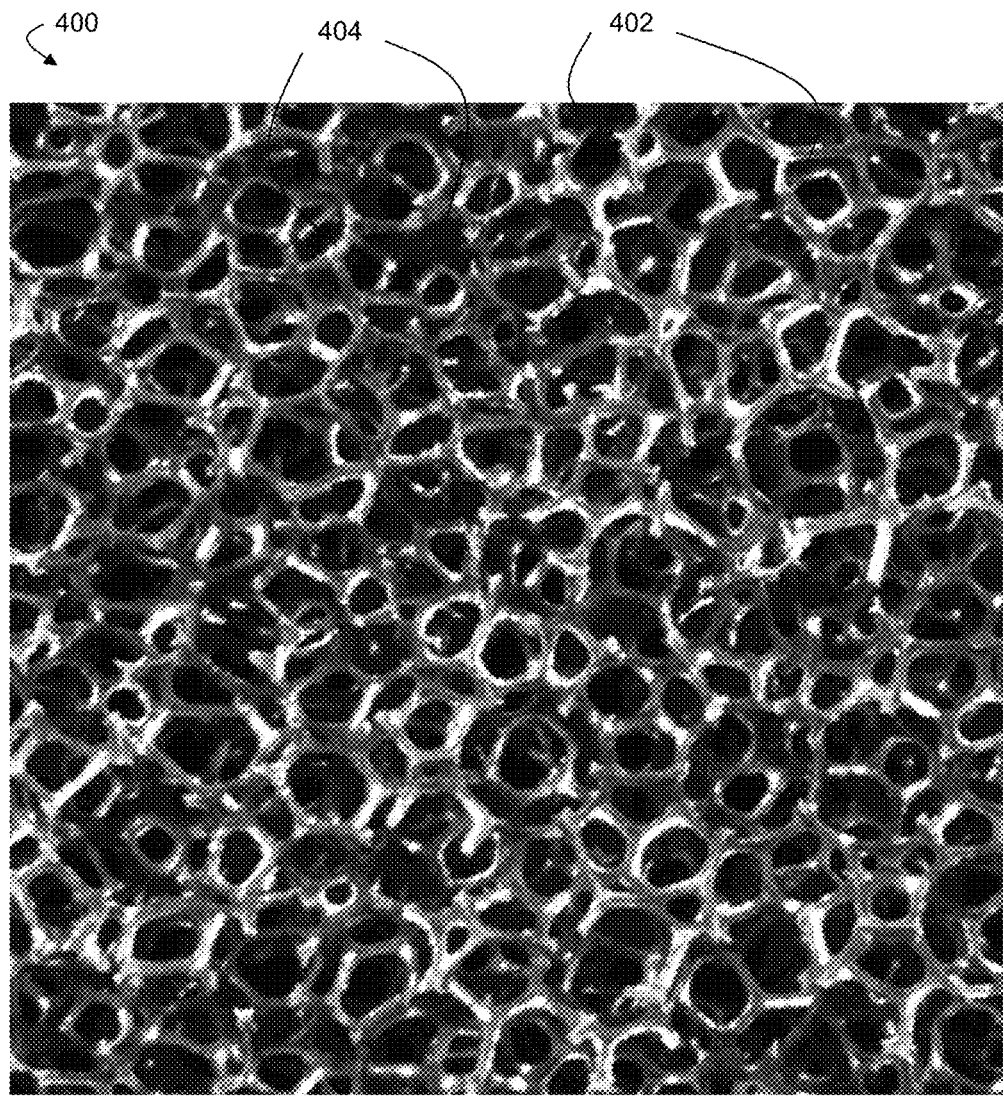
FIG. 4 is a photograph of an exemplary foam, which may be used as a porous medium according to certain embodiments.

In some embodiments, the porous medium comprises an open cell foam. FIG. 4 is a photograph of exemplary open cell foam 400 that can be used, according to certain embodiments, as the porous medium. In FIG. 4, open cell foam 400 comprises an interconnected network of solid material 402 (e.g., a polymeric material, a metal material, a ceramic material, or any other suitable material, including those described elsewhere herein) within which pores 404 are present. Non-limiting examples of commercially-available open cell foams include open cell polyurethane foam available from Wisconsin Foam Products (Madison, Wis.); filter foams available from All-Foam Products Company (Buffalo Grove, Ill.); open cell foams available from The Foam Factory (Macomb, Mich.); open cell polyester polyurethane foams available from Quality Foam Packaging (Lake Elsinore, Calif.); open cell foams available from Buffalo Felt Products Corp. (West Seneca, N.Y.); and ceramic open cell foams available from Ultramet (Pacoima, Calif.).

In some embodiments, the porous medium may comprise a prismatic medium. Generally, a prismatic medium is a porous medium comprising passageways having shapes that resemble geometric prisms. According to certain embodiments, the geometric prism-shaped passageways within the prismatic medium have a consistent cross-sectional shape along their length. The cross-section of the passageway can have a variety of shapes including, but not limited to, circular (e.g., in the case where the passageway has a cylindrical shape), elliptical (e.g., in the case of an elliptical prism), triangular (e.g., in the case of a triangular prism), and polygonal (regular, or otherwise, e.g., in the case of a polygonal prism). In certain embodiments, the cross-sectional shape of the passageway can be rectangular (e.g., in the case of a rectangular prism). In some embodiments, the cross-sectional shape of the passageway can be square. In certain embodiments, the cross-sectional shape of the passageway can be hexagonal (e.g., in the case of a honeycomb structure). Other cross-sectional shapes are also possible.

FIGS. 5A-5C are schematic diagrams illustrating an exemplary prismatic medium 500, according to certain embodiments. FIG. 5A is a perspective view of prismatic medium 500, FIG. 5B is a front view of prismatic medium 500, and FIG. 5C is a side view of prismatic medium 500. In FIGS. 5A-5C, prismatic medium 500 comprises a solid material 502 (e.g., a polymeric material, a metal material, a ceramic material, or any other suitable material, including those described elsewhere herein) within which passageways 504 are present. In the exemplary embodiment shown in FIGS. 5A-5C, the passageways of the prismatic medium have circular cross-sections. As noted above, in other cases, other cross-sectional shapes could be employed.

Figure 6:
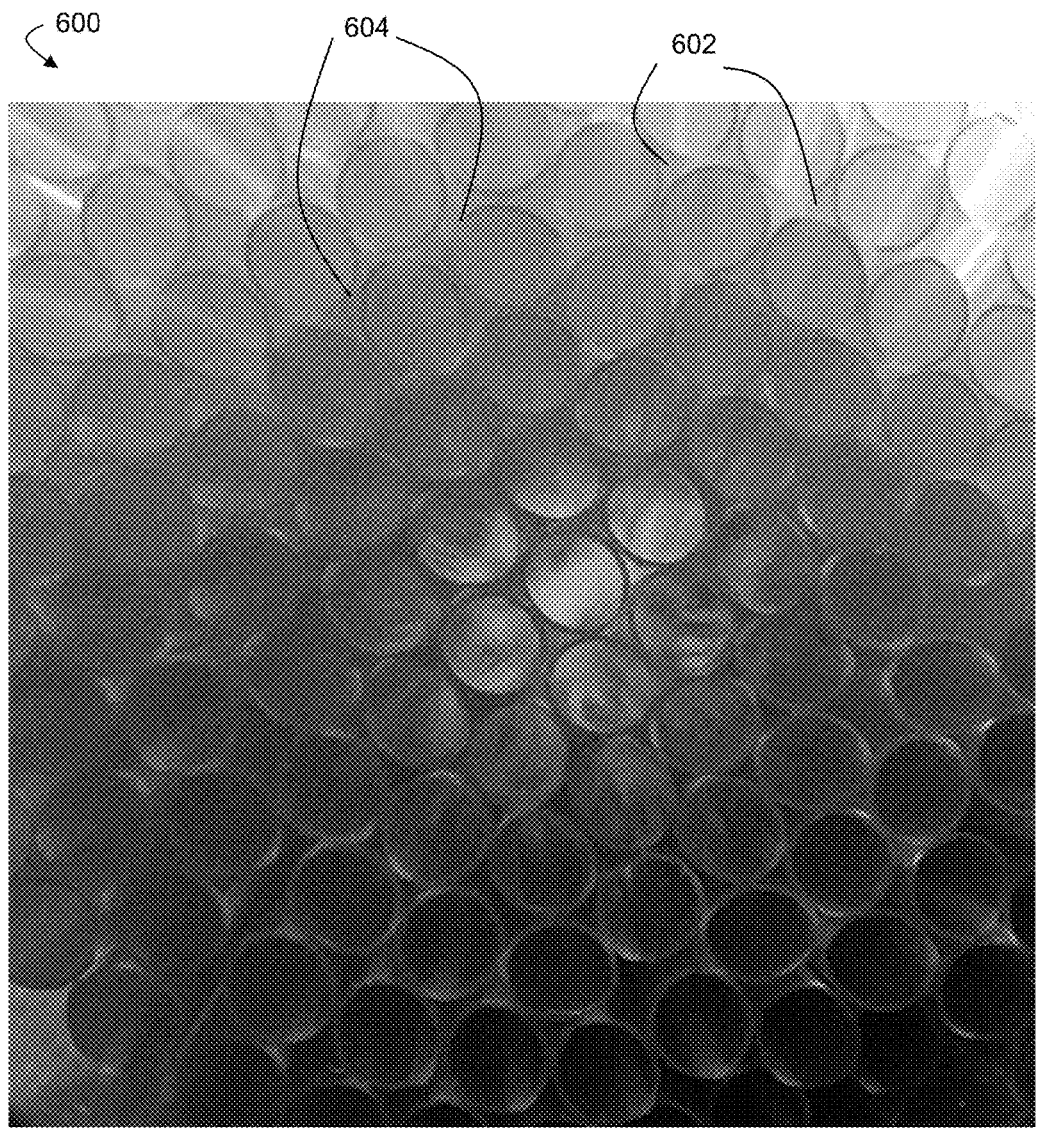
FIG. 6 is a photograph of an exemplary prismatic medium, according to some embodiments.

In some embodiments, the prismatic medium can be formed by bundling together a plurality of separate passageways to form the prismatic medium. For example, in FIGS. 5A-5C, prismatic medium 500 can be formed, according to certain embodiments, by bundling together a plurality of hollow cylindrical structures 506 to form prismatic medium 500. Another example of such a prismatic medium is shown in FIG. 6. FIG. 6 is a photograph of prismatic medium 600 formed by bundling together cylinders 602 comprising passageways 604.

In some embodiments, the prismatic medium can be formed by extruding a solid material such that prismatic passageways are formed within the solid material and/or by drilling, etching, or otherwise removing material from a solid material to form prismatic passageways. FIGS. 5D-5F are schematic illustrations of one such embodiment in which prismatic passageways have been formed in a bulk material. FIG. 5D is a perspective view of prismatic medium 550, FIG. 5E is a front view of prismatic medium 550, and FIG. 5F is a side view of prismatic medium 550. In FIGS. 5D-5F, prismatic medium 550 comprises a solid material 552 (e.g., a polymeric material, a metal material, a ceramic material, or any other suitable material, including those described elsewhere herein) within which passageways 554 are present. In the exemplary embodiment shown in FIGS. 5D-5F, the passageways of the prismatic medium have circular cross-sections. As noted above, in other cases, other cross-sectional shapes could be employed.

In some embodiments, the passageways within the prismatic medium can have a relatively low tortuosity. The tortuosity (or $\tau$) refers to the ratio of (1) the distance traced along the geometric centers of the cross-sections of the passageway along the length of the passageway ($L_{pass}$) to (2) the distance traced by a line segment connecting one end of the passageway to the other end of the passageway ($L_{segment}$), as shown in Equation 7 below:

$$\tau = \frac{L_{pass}}{L_{segment}}. \quad [7]$$

By this definition, wavy or otherwise curved passageways would have relatively high tortuosities, and perfectly straight passageways would have a tortuosity of 1. In some embodiments, at least some (e.g., at least 25%, at least 50%, at least 75%, at least 90%, at least 95% at least 99%, or more) of the passageways within the prismatic medium have a tortuosity of less than or equal to 2, less than or equal to 1.9, less than or equal to 1.8, less than or equal to 1.7, less than or equal to 1.6, less than or equal to 1.5, less than or equal to 1.4, less than or equal to 1.3, less than or equal to 1.2, less than or equal to 1.1, less than or equal to 1.05, or less than or equal to 1.01. In some embodiments, at least some (e.g., at least 25%, at least 50%, at least 75%, at least 90%, at least 95% at least 99%, or more) of the volume occupied by the passageways within the prismatic medium is occupied by passageways having a tortuosity of less than or equal to 2, less than or equal to 1.9, less than or equal to 1.8, less than or equal to 1.7, less than or equal to 1.6, less than or equal to 1.5, less than or equal to 1.4, less than or equal to 1.3, less than or equal to 1.2, less than or equal to 1.1, less than or equal to 1.05, or less than or equal to 1.01.

According to certain embodiments, the passageways within the prismatic medium are elongated. In some embodiments, at least some (e.g., at least 25%, at least 50%, at least 75%, at least 90%, at least 95% at least 99%, or more) of the passageways within the prismatic medium have an aspect ratio of at least 5, at least 10, at least 50, at least 100, at least 1000, or greater. In some embodiments, at least some (e.g., at least 25%, at least 50%, at least 75%, at least 90%, at least 95% at least 99%, or more) of the volume occupied by the passageways within the prismatic medium is occupied by passageways having an aspect ratio of at least 5, at least 10, at least 50, at least 100, at least 1000, or greater. The aspect ratio of a passageway within the prismatic medium is expressed as the ratio of (1) the distance traced along the geometric centers of the cross-sections of the passageway along the length of the passageway to (2) the maximum cross-sectional dimension of the passageway. For example, referring to FIGS. 5B-5C, the aspect ratio of passageways 504 would be determined by dividing distance 510 by distance 512.

According to certain embodiments, the porous medium may comprise surface features which may, for example, aid in the formation of precipitate on or within the porous medium. Non-limiting examples of suitable surface features include texturing, spikes, and/or corrugations. In some embodiments, surface features may increase the surface area and/or surface roughness of the porous medium. Those of ordinary skill in the art are familiar with techniques for determining root-mean-square surface roughness. Briefly, a surface profiling instrument such as an atomic force microscope or a profilometer, can be used to obtain a microscopic surface topography of heights ($z_{xi}$) as a function of a positional coordinate (x). Then, the root-mean-square surface roughness ($R_q$) may be calculated through the following equation:

$$R_q = \sqrt{\frac{1}{n}\sum_{i=1}^{n} z_{x_i}^2} \quad [8]$$

In some embodiments, the porous medium has a root-mean-square surface roughness ($R_q$) of greater than or equal to 1 nanometer, greater than or equal to 10 nanometers, greater than or equal to 100 nanometers, greater than or equal to 1 micrometer, greater than or equal to 2.5 micrometers, greater than or equal to 5 micrometers, greater than or equal to 10 micrometers, greater than or equal to 25 micrometers, greater than or equal to 50 micrometers, greater than or equal to 100 micrometers, greater than or equal to 250 micrometers, or greater than or equal to 500 micrometers. In certain embodiments, the porous medium may comprise a root-mean-square surface roughness of less than or equal to 1 mm, less than or equal to 500 micrometers, less than or equal to 250 micrometers, less than or equal to 100 micrometers, less than or equal to 50 micrometers, less than or equal to 25 micrometers, or less than or equal to 10 micrometers. Combinations of the above-referenced ranges are also possible (e.g., greater than or equal to 1 micrometer and less than or equal to 1 mm). Other ranges are also possible.

The porous medium may be fabricated from a variety of materials. In some embodiments, the porous medium may comprise a material which is stable when exposed to water and/or an alkaline aqueous solution of potassium hydroxide having a pH in the range of 12-15. A material is generally said to be "stable" in a given environment when that material can be exposed to the environment for a period of at least 12 hours (and, in some cases, at least 24 hours, at least 48 hours, at least 96 hours, or at least 192 hours) and, during that time, the material loses less than 15 wt % (or, in some cases, less than 10 wt %, less than 5% wt %, less than 2 wt %, less than 1 wt %, or less than 0.1 wt %) of its structure due to interaction (e.g., chemical or physical reactions) between the environment and the medium. According to certain embodiments, the porous medium loses less than 15 wt %, less than 10 wt %, less than 5% wt %, less than 2 wt %, less than 1 wt %, or less than 0.1 wt % of its structure during operation of the electrochemical system.

In some embodiments, the porous medium can be exposed to water such that, after a period of at least 12 hours (and, in some cases, at least 24 hours, at least 48 hours, at least 96 hours, or at least 192 hours), the porous medium loses less than 50%, less than 25%, less than 10%, less than 5%, less than 2%, or less than 1% of its ultimate tensile strength prior to exposure to the water. According to certain embodiments, the porous medium can be exposed to an alkaline aqueous solution of potassium hydroxide with a pH in the range of 12-15 such that, after a period of at least 12 hours (and, in some cases, at least 24 hours, at least 48 hours, at least 96 hours, or at least 192 hours), the porous medium loses less than 50%, less than 25%, less than 10%, less than 5%, less than 2%, or less than 1% of its ultimate tensile strength prior to exposure to the alkaline aqueous solution. According to certain embodiments, the porous medium loses, during operation of the electrochemical system, less than 50%, less than 25%, less than 10%, less than 5%, less than 2%, or less than 1% of its ultimate tensile strength prior to operation of the electrochemical system.

In certain embodiments, the porous medium may comprise a polymer, such as an organic polymer. Non-limiting examples of suitable polymers include polyesters, polyethers, polyprolyene, polyacrylics, polystyrenes, acrylonitrile butadiene styrene, poly(tetrafluoroethylene) (e.g., Teflon®), and/or blends of two or more of these. In some embodiments, the porous medium comprises a metal (e.g., iron (e.g., as in the case of stainless steel), nickel, titanium, and/or alloys of these and/or other metals). In some embodiments, the porous medium comprises a metal oxide (e.g., an aluminum oxide, a titanium oxide, and/or combinations of these and/or other metal oxides). In some embodiments, the porous medium comprises a ceramic, such as an alumina ceramic.

According to certain embodiments, at least a portion of the surface of the porous medium may be functionalized. Functionalization may comprise modifying the surface chemistry of the porous medium, introducing chemical functional groups at the surface of the porous medium, and/or depositing a layer of material that adheres to the surface of the porous medium. According to certain embodiments, functionalizing the porous medium may enhance the degree to which precipitation occurs on the surfaces of the porous medium, relative to the amount of precipitation that would occur on the surfaces of the porous medium in the absence of the functionalization but under otherwise identical conditions.

In certain embodiments, functionalizing the surface of the porous medium may involve forming oxide functional oxide groups on the porous medium surface. These oxide groups can then serve as active sites for aluminum hydroxide crystallization. The oxide groups may be formed by treating the surface of the porous medium with oxygen plasma or ozone.

In other embodiments, functionalizing the surface of the porous medium may comprise seeding or embedding particles such as powdered aluminum hydroxide on the surface of the porous medium. The embedded or seeded locations can then serve as additional nucleation sites for aluminum hydroxide crystallization.

In other embodiments, a layer of crystalline aluminum hydroxide or any other crystalline material may be deposited across the surface of the porous medium. The layer of crystalline aluminum hydroxide can then serve as additional nucleation sites for aluminum hydroxide crystallization.

There are several different methods for depositing the layer of crystalline aluminum hydroxide. These methods may involve creating an aqueous solution under conditions that dissolve aluminum hydroxide. These methods to increase aluminum hydroxide solubility may include at least one of the following: raising the temperature of the solution, increasing the pH of the solution to favor dissolution in the form of aluminate, and decreasing the pH of the solution to favor aluminum hydroxide dissolution in the form of positively charged aluminum ions. The porous media may then be placed in the solution, and the conditions changed such that the aluminum hydroxide is no longer soluble and precipitates on the porous media.

Other methods may include a step involving the addition of non-aqueous solvents, such as methanol and ethanol, to the solution described above to reduce the solubility of aluminum hydroxide and cause precipitation on the porous media.

Alternatively, the porous media may be placed in an alkaline electrolyte with solid aluminum. The reaction of aluminum and hydroxide produces aluminum hydroxide that can precipitate onto the porous media.

In other embodiments, a layer of a functionalized polymer can be deposited on the surface of the porous media. This layer of functionalized polymer can then serve as additional nucleation sites for aluminum hydroxide crystallization.

While a single porous medium has been shown in the figures, it should be understood that, in other cases, the porous medium can be made up of a plurality of separate units. For example, in some embodiments, the porous medium may be made up of at least two, at least three, at least four, at least five, at least ten, or more separate pieces. According to some embodiments, the porous medium may be made up of parts that are in contact but separable. That is to say, the separate parts of the porous medium may be able to be separated from each other without breaking covalent chemical bonds. In certain embodiments, the porous medium of the electrochemical system can be made up of separate pieces of porous material that are separated from each other. In some such embodiments, the pieces of porous medium can be distributed at multiple locations within the electrochemical system, for example, to induce precipitation in regions that reduce or minimize the adverse impact of the precipitation.

In accordance with certain embodiments, at least a portion (or all) of the porous medium may be capable of being removed from the electrochemical system. In some embodiments, removal of the porous medium comprises automated removal and/or manual removal of the porous medium.

Figure 1E:
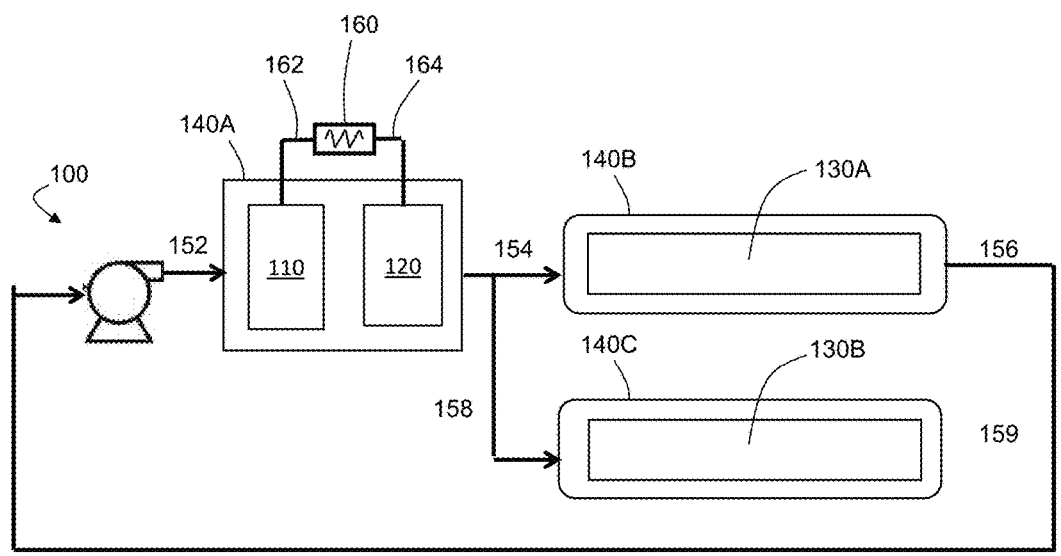
FIG. 1E is a schematic diagram of an electrochemical system comprising a bypass, in accordance with some embodiments.

According to certain embodiments, after the precipitation occurs on or within the porous medium, the flow of electrolyte through the porous medium may be stopped. Stopping the flow of electrolyte through the porous medium can comprise, for example, removing the porous medium from the electrochemical system and/or by altering the flow path of the electrolyte such that the electrolyte no longer flows through the porous medium. For example, in FIG. 1E, stopping the flow of electrolyte through porous medium 130A may be achieved, for example, by re-routing the flow of the electrolyte away from vessel 140B and toward vessel 140C (which contains porous medium 130B) via conduits 158 and 159.

According to certain embodiments, the porous medium may be capable of being removed from the electrochemical system without substantially damaging the porous medium. According to certain embodiments, the porous medium may be capable of being removed from the electrochemical system by hand (e.g., by a user) without substantially damaging the porous medium. Substantial damage to the porous medium generally refers to permanent deformation or degradation of at least 25% (and, in some cases, at least 15%, at least 10%, or at least 5%) of the volume of the porous medium. In some embodiments, the porous medium is capable of being removed from the electrochemical system (e.g., by hand) without degrading more than 25% (and, in some cases, more than 15%, more than 10%, or more than 5%) of the porous medium. Damage to the porous medium may comprise many forms, such as ripping, perforating, chemically degrading, etc. In some embodiments, damage to the porous medium may comprise a reduction in the externally-accessible pore volume and/or externally-accessible surface area of the porous medium. In some embodiments, the porous medium may be capable of being removed from the electrochemical system without breaking any covalent bonds.

Certain inventive embodiments comprise transporting the electrolyte through the porous medium such that precipitation occurs on one or more surfaces of the porous medium. In some embodiments, transport through the porous medium may occur within a closed-loop system (i.e., a system in which the electrolyte is continually cycled through the system). In some embodiments, transporting the electrolyte may comprise applying a driving force to the electrolyte such that it flows through the porous medium. According to certain embodiments, the driving force may be applied to the electrolyte by using a pump (e.g., to establish a pressure drop that causes the electrolyte to flow), by gravity (e.g., by arranging the components of the electrochemical system such that gravity forces the electrolyte through the porous medium), by thermal convection, or using a combination of these. In some embodiments, the electrolyte may be transported by thermally-driven convection, for example, caused by a thermal gradient within the electrochemical system. According to certain embodiments, the thermal gradient may be present due to an electrochemical reaction. For example, in some cases, an electrochemical reaction (e.g., at the electrode(s)) may produce heat, which may heat a portion of the electrolyte. The heated portion of the electrolyte may then be transported away from the electrodes via thermally-induced convection, which may result in at least a portion of the electrode being transported through the porous medium. In certain embodiments, the electrolyte may be transported by convection caused by rising bubbles of gas and/or supercritical fluid within the electrochemical system. In accordance with some embodiments, the gas and/or supercritical fluid bubbles may comprise a product of the electrochemical reaction. For example, in certain embodiments, the gas and/or supercritical fluid bubbles may comprise hydrogen. The hydrogen may be generated, for example, as a byproduct of an electrochemical reaction in an aluminum-water or aluminum-air electrochemical system.

In some embodiments, inventive methods may comprise precipitation of a solid comprising aluminum. Generally, precipitation involves the formation of a solid from one or more species dissolved in a liquid. In some embodiments, precipitation may occur from a saturated or supersaturated electrolyte (i.e., an electrolyte that contains a dissolved species present at a level at or above its solubility limit). In certain embodiments, precipitation may occur from a liquid (e.g., an electrolyte liquid) that contains aluminate in an amount at or in excess of the solubility limit of the aluminate in the liquid. As understood by those of ordinary skill in the art, the solubility of a given species in a liquid, and thus whether or not the liquid is saturated or supersaturated with respect to that species, can vary with solvent type, pH, temperature, and/or pressure of the mixture of the liquid and species. Generally, the solubility of aluminate ions in an aqueous electrolyte can be approximated by the use of Equations 9 and 10, shown below:

$$K_{sp}(T, P) = K_0 e^{-\frac{\Delta V}{RT}(P-P_0) - \frac{\Delta H^0}{R}\left(\frac{1}{T} - \frac{1}{T_0}\right)} \quad [9]$$

$$K_{sp} = \frac{[OH^-_{(aq)}]}{[Al(OH)_{4\,(aq)}^-]} \quad [10]$$

where $K_{sp}(T,P)$ is the solubility of aluminate at a given temperature T and Pressure P, $T_0$ and $P_0$ are reference temperatures and pressures, $\Delta V$ is the change in molar volume associated with the reaction, $\Delta H^0$ is the standard enthalpy of the reaction at the reference conditions, $[OH^-_{(aq)}]$ is the concentration of aqueous hydroxide ions, and $[Al(OH)_{4\,(aq)}^-]$ is the concentration of aqueous aluminate ions.

Without wishing to be bound by theory, it is also recognized that at least two methods of precipitation are possible: heterogeneous precipitation and homogeneous precipitation. Homogeneous precipitation occurs by a process involving the nucleation of crystals within the bulk of a solution which then increases in mass via a growth process. In contrast, heterogeneous precipitation occurs when a solid (i.e., the precipitate) is formed on a solid surface at an interface between the solid surface and the liquid comprising the precursor of the precipitate. In some embodiments, at least a portion of the product of an electrochemical reaction within the electrochemical system is heterogeneously precipitated on a surface of the porous medium. For example, in certain embodiments in which an aluminum-water electrochemical system or an aluminum-air electrochemical system is employed, at least a portion of the aluminate byproduct produced in the electrochemical system can be precipitated on a surface of the porous medium.

According to certain embodiments, precipitation may occur on a surface, such as on a surface of the porous medium. It should be understood that precipitation that occurs "on a surface" includes both the initial heterogeneous precipitation of the precipitate directly on the surface as well as subsequent further heterogeneous precipitation of precipitate over the initially-formed precipitate. Thus, the precipitate that is formed "on a surface" can be in direct contact with that surface, or it can be in indirect contact with that surface via an underlying precipitate. Accordingly, in some embodiments, precipitation on a surface may result in solids which are directly disposed on the surface during the initial stages of precipitation (e.g., during which the surface may be directly exposed to an electrolyte containing a precursor of the precipitate, such as aluminate in certain cases in which the precipitate comprises aluminum hydroxide ($Al(OH)_3$), aluminum oxide ($Al_2O_3$), and/or aluminum oxide hydroxide ($AlO(OH)$)). Also, in certain embodiments, precipitation on a surface may result in solids which are indirectly disposed on the surface during later stages of precipitation (e.g., after a substantial amount of precipitate has already accumulated on the surface).

As noted above, the surface on which precipitation occurs comprises, according to certain embodiments, a surface of the porous medium, such as the externally-accessible surface area of the porous medium. In some embodiments, a relatively large percentage of the precipitate that is formed within the electrochemical system during operation, from products of the electrochemical reaction(s) of the electrochemical system, occurs on a surface of the porous medium and/or within the pores (e.g., externally-accessible pores) of the porous medium. According to certain embodiments, by forming a relatively large percentage of such precipitate on a surface of the porous medium and/or within the pores (e.g., externally-accessible pores) of the porous medium, the location of precipitate formation can be controlled, which can reduce or prevent precipitate formation in unwanted locations, as described elsewhere herein. According to certain embodiments, at least 10 wt %, at least 25 wt %, at least 50 wt %, at least 75 wt %, at least 90 wt %, at least 95 wt %, or at least 99 wt % (and/or, in some embodiments, up to 99.9 wt %, up to 99.99 wt %, or up to 100 wt %) of the precipitate that is formed within the electrochemical system during operation, from products of the electrochemical reaction(s) of the electrochemical system, occurs on a surface of the porous medium and/or within the pores (e.g., externally-accessible pores) of the porous medium. Combinations of the above-referenced ranges are also possible (e.g., at least 10 wt % and up to 100 wt %). Other ranges are also possible. To determine the weight percentage of the precipitate that is formed, on a surface of the porous medium and/or within the pores of the porous medium, from products of the electrochemical reaction(s) of the electrochemical system, one would perform the following analysis. After operating the electrochemical system such that precipitate is formed, one would determine the mass of the precipitate that was formed on a surface of the porous medium and/or within the pores of the porous medium and that includes a product of the electrochemical reaction performed in the electrochemical system (i.e., $m_{pm}$). One would then determine the mass of the precipitate that was formed elsewhere in the electrochemical system and that includes a product of the electrochemical reaction performed in the electrochemical system (i.e., $m_{outside}$). The weight percentage of the precipitate that is formed, on a surface of the porous medium and/or within the pores of the porous medium, from products of the electrochemical reaction(s) of the electrochemical system (i.e., wt %$_{pm}$) would then be determined as follows:

$$\text{wt \% } pm = \frac{m_{pm}}{m_{outside} + m_{pm}} \times 100\% \quad [11]$$

In some embodiments, a relatively large percentage of the precipitate that is formed within the electrochemical system during operation, from products of the electrochemical reaction(s) of the electrochemical system, occurs as heterogeneous precipitation on one or more surfaces of the porous medium. For example, in some embodiments, at least 10 wt %, at least 25 wt %, at least 50 wt %, at least 75 wt %, at least 90 wt %, at least 95 wt %, or at least 99 wt % (and/or, in some embodiments, up to 99.9 wt %, up to 99.99 wt %, or up to 100 wt %) of the precipitate that is formed within the electrochemical system during operation, from products of the electrochemical reaction(s) of the electrochemical system, occurs as heterogeneous precipitation on one or more surfaces of the porous medium. In some embodiments, a relatively large percentage of the precipitate that is formed within the electrochemical system during operation, from products of the electrochemical reaction(s) of the electrochemical system, occurs as heterogeneous precipitation on one or more surfaces within pores (e.g., externally-accessible pores) of the porous medium. For example, in some embodiments, at least 10 wt %, at least 25 wt %, at least 50 wt %, at least 75 wt %, at least 90 wt %, at least 95 wt %, or at least 99 wt % (and/or, in some embodiments, up to 99.9 wt %, up to 99.99 wt %, or up to 100 wt %) of the precipitate that is formed within the electrochemical system during operation, from products of the electrochemical reaction(s) of the electrochemical system, occurs as heterogeneous precipitation on one or more surfaces within pores (e.g., externally-accessible pores) of the porous medium.

In some embodiments, a relatively large percentage of the precipitate that is formed within the electrochemical system during operation, from products of the electrochemical reaction(s) of the electrochemical system, occurs within pores (e.g., externally-accessible pores) of the porous medium. For example, in some embodiments, at least 10 wt %, at least 25 wt %, at least 50 wt %, at least 75 wt %, at least 90 wt %, at least 95 wt %, or at least 99 wt % (and/or, in some embodiments, up to 99.9 wt %, up to 99.99 wt %, or up to 100 wt %) of the precipitate that is formed within the electrochemical system during operation, from products of the electrochemical reaction(s) of the electrochemical system, occurs within pores (e.g., externally-accessible pores) of the porous medium.

The precipitate that is formed within the electrochemical system may be made of a variety of materials. According to some embodiments, the precipitate may comprise a product of the electrochemical reaction carried out within the electrochemical system. For example, according to certain embodiments, the precipitate may comprise atoms and/or ions which are generated during the electrochemical reaction. As one non-limiting example, in certain embodiments, such as certain embodiments in which the electrochemical system is an aluminum-water electrochemical system or an aluminum-air electrochemical system, aluminate may be generated as a byproduct of an electrochemical reaction conducted in the electrochemical system. The aluminate may then, according to certain embodiments, be precipitated within the electrochemical system (e.g., on a surface of the porous medium and/or within the pores of the porous medium), for example, in the form of aluminum hydroxide ($Al(OH)_3$), aluminum oxide ($Al_2O_3$), and/or aluminum oxide hydroxide ($AlO(OH)$).

In some embodiments, a relatively high percentage of the precipitate that is formed is made up of products (e.g., atoms and/or ions) which are generated during the electrochemical reaction. Such situations are in contrast to situations in which a reactant is stored within the electrochemical system (e.g., on a surface of a porous medium), and the reactant reacts with the product of the electrochemical reaction to form a solid product containing both the product of the electrochemical reaction and the reactant. According to certain embodiments, at least 5 wt %, at least 10 wt %, at least 25 wt %, at least 50 wt %, at least 80 wt %, at least 90 wt %, at least 95 wt %, at least 99 wt %, or all of the precipitate that is formed from products of the electrochemical reaction(s) within the electrochemical system (e.g., on a surface of the porous medium and/or within the pores, such as externally-accessible pores, of the porous medium) is made up of products of the electrochemical reaction(s). Such precipitates may be considered to be "self-forming." In certain embodiments, the precipitate may comprise a salt in which both the cation and the anion of the salt are products generated via the electrochemical reaction(s) of the electrochemical system. According to some embodiments, the precipitate may comprise a precipitate which is not a salt.

One non-limiting example of a situation in which a high percentage of the precipitate that is formed is made up of products which are generated during the electrochemical reaction involves the formation of precipitate from aluminate in an aluminum-water or aluminum-air electrochemical system. As noted above, aluminate ($Al(OH)_4^-$) can be generated as a byproduct of the electrochemical reactions in aluminum-water and aluminum-air electrochemical systems. When aluminate is present in the electrolyte at or above its saturation limit, the aluminate can precipitate, for example, in the form of aluminum hydroxide ($Al(OH)_3$), aluminum oxide ($Al_2O_3$), and aluminum oxide hydroxide ($AlO(OH)$). In all three of these cases, the aluminum, oxygen, and hydrogen atoms present in the precipitate all originate from the aluminate. Thus, in such cases, approximately 100 wt % of the precipitate that is formed is made up of a product (i.e., aluminate) generated during the electrochemical reaction of the electrochemical system.

In some embodiments, the precipitate may comprise aluminum. Non-limiting examples of precipitates comprising aluminum that may be formed include aluminum hydroxide ($Al(OH)_3$), aluminum oxide ($Al_2O_3$), and aluminum oxide hydroxide ($AlO(OH)$). These precipitates may be formed, according to certain embodiments, alone or in combination. The precipitate may be in any suitable polymorph. According to certain embodiments, the precipitate may be one or more of gibbsite, bayerite, doyleite, nordstrandite, pseudoboehmite, and boehmite.

According to certain embodiments, after the precipitation, the precipitate and the solid material from which the porous medium is made can form a composite material. In some such embodiments, the precipitate occupies a relatively large percentage of the geometric volume of the composite formed by the precipitate and the porous medium. For example, in some cases, after precipitation has been performed, the precipitate and the solid material of the porous medium form a composite in which the precipitate occupies at least 50%, at least 70%, at least 80%, at least 90%, at least 95%, at least 98%, or more of the geometric volume of the composite. Such composites may be formed, according to certain embodiments, by using a porous medium whose volume is made up of a relatively large amount of externally-accessible pores and a relatively small amount of closed-cells and solid material within which the pores are formed. In some embodiments, at least 50%, at least 70%, at least 80%, at least 90%, at least 95%, at least 98%, or more of the geometric volume of the porous medium within which precipitation occurs is made up of externally-accessible pores prior to precipitation. Other ranges are also possible. For example, in some embodiments, the precipitate and the solid material of the porous medium form a composite in which the precipitate occupies at least 5%, at least 10%, or at least 25% of the geometric volume of the composite. In some embodiments, at least 5%, at least 10%, or at least 25% of the geometric volume of the porous medium within which precipitation occurs is made up of externally-accessible pores prior to precipitation.

In some embodiments, after precipitation has been performed, the precipitate and the solid material of the porous medium form a composite in which the precipitate makes up at least 50 wt %, at least 70 wt %, at least 80 wt %, at least 90 wt %, at least 95 wt %, at least 98 wt %, or more of the mass of the composite. Other ranges are also possible. For example, in some embodiments, the precipitate and the solid material of the porous medium form a composite in which the precipitate makes up at least 5%, at least 10%, or at least 25% of the mass of the composite.

In some embodiments, after precipitation, the composite material including the precipitate and the solid material from which the porous medium is made has a density of at least 1.0 g/cm$^3$, at least 1.1 g/cm$^3$, at least 1.5 g/cm$^3$, at least 1.8 g/cm$^3$, at least 2.0 g/cm$^3$, at least 2.2 g/cm$^3$, at least 2.4 g/cm$^3$, or at least 2.5 g/cm$^3$ (and/or, in some embodiments, up to 2.6 g/cm$^3$, or more).

As noted above, certain embodiments are related to inventive electrochemical systems and/or inventive methods of operating electrochemical systems. In some embodiments, the electrochemical system may be a fuel cell. As will be understood by one of ordinary skill in the art, a fuel cell is an electrochemical system which is configured such that at least one of the reactants that participates in the electrochemical reaction is transported into the fuel cell from an external location during operation. In some embodiments, more than one (or all) of the reactants that participate in the electrochemical reaction(s) of the electrochemical system are transported into the fuel cell from an external location during operation. The fuel cell may be configured, in some embodiments, such that at least one reactant that participates in the electrochemical reaction(s) of the electrochemical system is not transported into the fuel cell from an external location during operation (e.g., the reactant may be pre-loaded into the fuel cell prior to operation of the fuel cell).

In certain embodiments, the electrochemical system may be a battery. As will be understood by one of ordinary skill in the art, a battery is an electrochemical system which is configured such that no reactants that participate in the electrochemical reaction(s) of the electrochemical system are transported into the electrochemical system during operation of the electrochemical system. That is to say, in a battery, all reactants that participate in the electrochemical reaction(s) of the electrochemical system are located within the electrochemical system prior to operation. For the avoidance of doubt, all electrochemical systems are able to be classified as either fuel cells or batteries.

In some embodiments, the electrochemical system can be a water-activated electrochemical system. A water-activated electrochemical system is one that consumes water during operation. In some embodiments, the electrochemical system can be configured such that water is an electrochemically active material within the electrochemical system.

Electrochemical systems can generally be classified into non-rechargeable (i.e., primary) and rechargeable (i.e., secondary) electrochemical systems. In certain cases, the embodiments described herein can be particularly useful when employed in non-rechargeable electrochemical systems.

The first electrode of the electrochemical system (which can be, for example, an anode) can be made of a variety of materials. In certain embodiments, the first electrode may comprise aluminum. The aluminum within the first electrode may be in electrochemically active form, in some such embodiments. According to some embodiments, the aluminum in the first electrode is elemental aluminum (i.e., aluminum having an oxidation state of 0). For example, the aluminum in the first electrode may be in the form of aluminum metal and/or as a component of an alloy that contains aluminum. Ionic aluminum can be present within the first electrode, according to certain embodiments. Examples of electrochemical systems in which aluminum is present in an electrode include, for example, aluminum-water electrochemical systems and aluminum-air electrochemical systems.

In some embodiments, the first electrode contains aluminum in an amount of greater than or equal to 51 wt %, greater than or equal to 60 wt %, greater than or equal to 70 wt %, greater than or equal to 80 wt %, greater than or equal to 90 wt %, greater than or equal to 95 wt %, or greater than or equal to 99 wt %. In certain embodiments, the first electrode contains aluminum in an amount of less than or equal to 100 wt %, less than or equal to 99 wt %, less than or equal to 95 wt %, less than or equal to 90 wt %, less than or equal to 80 wt %, less than or equal to 70 wt %, or less than or equal to 60 wt %. Combinations of the above-referenced ranges are also possible (e.g., greater than or equal to 51 wt % and less than or equal to 100 wt %). Other ranges are also possible.

In certain embodiments, aluminum makes up a relatively large percentage of all solid electrochemically active material present within the first electrode (e.g., prior to use (e.g., prior to first use) of the electrochemical system). For example, in some embodiments, aluminum makes up greater than or equal to 51 wt %, greater than or equal to 60 wt %, greater than or equal to 70 wt %, greater than or equal to 80 wt %, greater than or equal to 90 wt %, greater than or equal to 95 wt %, or greater than or equal to 99 wt % of all solid electrochemically active material present within the first electrode (e.g., prior to use (e.g., prior to first use) of the electrochemical system). In certain embodiments, aluminum makes up less than or equal to 100 wt %, less than or equal to 99 wt %, less than or equal to 95 wt %, less than or equal to 90 wt %, less than or equal to 80 wt %, less than or equal to 70 wt %, or less than or equal to 60 wt % of all solid electrochemically active material present within the first electrode (e.g., prior to use (e.g., prior to first use) of the electrochemical system). Combinations of the above-referenced ranges are also possible (e.g., greater than or equal to 51 wt % and less than or equal to 100 wt %). Other ranges are also possible.

In some embodiments, the first electrode may also comprise at least one non-aluminum metal (in addition to comprising aluminum). In some embodiments, the non-aluminum metal can be in electrochemically active form. In certain embodiments, the non-aluminum metal can be in a form that is not electrochemically active. Non-limiting examples of suitable non-aluminum metals that may be present in the first electrode include gallium, indium, magnesium, and tin. Each of these metals may be independently present in elemental form, as a component of an aluminum-containing alloy, and/or as an ion.

The first electrode can also include, according to some embodiments, a current collector. The current collector (as opposed to solid electrochemically active material) is generally not electrochemically active, and simply facilitates the transfer of electrons into and/or out of the electrode. In some embodiments, the current collector is in the form of an electrically conductive layer (e.g., a metal layer, a carbon layer). The current collector could also be in the form of an electrically conductive mesh (e.g., a metal mesh, a carbon mesh). In certain embodiments, the solid electrochemically active material within the electrode may itself be sufficiently electrically conductive to facilitate electron transport, in which case, current collector material that is not electrochemically active may be absent.

The second electrode (which can be, for example, the cathode) may also contain a variety of suitable materials. In some embodiments, the second electrode contains little or no solid electrochemically active material. For example, the second electrode may, in some embodiments, contain solid electrochemically active material in an amount of less than 10 wt %, less than 5 wt %, less than 2 wt %, less than 1 wt %, or less than 0.1 wt % (e.g., prior to use (e.g., prior to first use) of the electrochemical system). Of course, in other embodiments, the second electrode may contain a substantial amount of solid electrochemically active material (e.g., greater than 10 wt %, greater than 25 wt %, or more), for example, prior to use (e.g., prior to first use) of the electrochemical system.

The second electrode can, according to certain embodiments, comprise a current collector. The current collector of the second electrode can be, according to certain embodiments, an electrically conductive material in any of a number of suitable form factors. In some embodiments, the current collector of the second electrode can be in the form of a foam, a plate, or a mesh of electrically conductive material. The current collector of the second electrode can be made of a number of materials, including but not limited to stainless steel, titanium, nickel, and/or combinations thereof. In some embodiments, at least a portion (or all) of the current collector of the second electrode can be coated with a catalyst. Examples of suitable catalysts include, but are not limited to, platinum, nickel, iron, molybdenum, cobalt, and combinations thereof.

In certain embodiments, the second electrode may be in contact with a fluid electrochemically active material, such as gas and/or supercritical fluid phase oxygen and/or water. In aluminum-water electrochemical systems, for example, the second electrode is typically in contact with water (which may form part of, for example, an aqueous electrolyte of the aluminum-water electrochemical system). As another example, in aluminum-air electrochemical systems, the second electrode is typically in contact with both water (e.g., as part of the aqueous electrolyte) and gas and/or supercritical fluid phase oxygen, both of which may serve as electrochemically active materials.

In some embodiments, the first and/or second electrodes may be in contact with a fluid electrolyte (e.g., a liquid and/or supercritical fluid electrolyte). In some embodiments, the first and/or second electrodes are in contact with a liquid electrolyte. Generally, the electrolyte is capable of conducting ions but is not capable of conducting a sufficient amount of electricity to result in a short circuit of the electrochemical system. The presence of the electrolyte in an electrochemical system may allow, in certain cases, for the electrodes to remain uncharged while undergoing redox reactions during operation of the electrochemical system.

The electrolyte might not always be present in the electrochemical system. For example, in some cases, the electrochemical system may not include some components of an electrolyte until the electrochemical system is in use. This may be the case, for example, when it is desired to transport the electrochemical systems in a dry state and/or when the components of the electrolyte material are readily available at the point of use (e.g., in the case where a water-based electrolyte is used and water is readily available at the point of use). In some embodiments, the electrochemical system includes the electrolyte salt (e.g., potassium hydroxide, sodium hydroxide, or another suitable salt), but does not include water. In some such embodiments, water may be added to the electrochemical system at the point of use. Thus, the presence of the electrolyte within the electrochemical system is optional.

Generally, as noted above, the electrolyte serves as a medium for the transport of ions between the anode and the cathode. According to certain embodiments, the electrolyte may comprise one or more dissolved species. In some embodiments, the electrolyte may comprise one or more dissolved salts. Non-limiting examples of such salts include, but are not limited to, sodium hydroxide, potassium hydroxide, a combination of sodium and potassium hydroxide, and/or other salts. The salt may, according to certain embodiments, act as a pH buffer in the electrochemical system. In some embodiments, the electrolyte comprises an aqueous solution containing hydroxide ions. In some embodiments, the electrolyte comprises an aqueous solution comprising potassium ions. In certain embodiments, the electrolyte comprises aqueous potassium hydroxide. The electrolyte may also contain, according to certain embodiments, one or more byproducts of the electrochemical reaction(s) employed by the electrochemical system. The byproducts may be, in some cases, in ionic form. For example, in some embodiments, the electrolyte can contain solubilized aluminate.

In some embodiments, the electrolyte is an aqueous electrolyte. In some such embodiments, the electrolyte contains water in an amount of at least 50 wt %, at least 75 wt %, at least 90 wt %, or more.

According to certain embodiments, the electrolyte is a basic electrolyte. The basic electrolyte may have, according to certain embodiments, any suitable alkaline pH. In some embodiments, the electrolyte may have a pH of greater than or equal to 8, greater than or equal to 9, greater than or equal to 10, greater than or equal to 11, greater than or equal to 12, greater than or equal to 13, greater than or equal to 14, or greater than or equal to 15. According to certain embodiments, the electrolyte may have a pH of less than or equal to 16, less than or equal to 15, less than or equal to 14, less than or equal to 13, less than or equal to 12, less than or equal to 11, less than or equal to 10, or less than or equal to 9. Combinations of the above-referenced ranges are also possible (e.g., greater than or equal to 12 and less than or equal to 15). Other ranges are also possible.

In some embodiments, the electrochemical system may be capable of producing one or more products of an electrochemical reaction that does not form a precipitate during standard operation. In some embodiments, the electrochemical system may produce gases and/or supercritical fluids during operation. In some embodiments, gaseous and/or supercritical hydrogen ($H_2$) may be produced as a product of an electrochemical reaction during operation of the electrochemical system. For example, referring to Reaction B above, in certain aluminum-water electrochemical systems, gaseous and/or supercritical hydrogen ($H_2$) may be produced as a product of the reaction between water and the electrons from the anode. Hydrogen may also be produced during the operation of an aluminum-air electrochemical system, according to some embodiments. In some embodiments, the gases and/or supercritical fluid electrochemical byproducts may be transported out of the electrochemical system during operation.

In certain embodiments, the electrochemical system may comprise additional components. For example, the electrochemical system may further comprise, according to certain embodiments, electrical contact pads and/or electrical leads (which can be connected to, for example, an external electrical load). In some embodiments, the electrochemical system can be connected to an external electrical load, which can be powered by the electrochemical system during operation.

Other non-limiting examples of additional components include pumps, valves, storage tanks, flow meters, and mixers. In some embodiments, the electrochemical system may comprise a pump which is fluidically connected to the electrolyte. In certain embodiments, the electrochemical system may comprise a valve which is capable of allowing any gases or supercritical fluids generated during electrochemical system operation (e.g., hydrogen) to escape. In some embodiments, the electrochemical system may comprise a valve which is capable of allowing water and/or seawater into the vessel. Additionally, in some embodiments, additional components such as structures, supports, and non-conductive separators may be present.

The electrochemical systems described herein may be operated at a variety of suitable temperatures. According to certain embodiments, the electrochemical system is operated at a temperature such that the electrolyte remains in liquid and/or supercritical fluid form. In certain embodiments, the electrochemical system is operated at a temperature such that the electrolyte remains in liquid form. For example, according to certain embodiments, the electrochemical system may be operated at any temperature between 0° C. and 100° C. when under atmospheric pressure (i.e., 1 atm) or greater (e.g., at the increased pressure imposed by hydrostatic pressure underwater).

The electrochemical systems described herein may be operated at a variety of suitable pressures. According to certain embodiments, the electrochemical system is operated at a pressure such that the electrolyte remains in liquid and/or supercritical fluid form. In certain embodiments, the electrochemical system is operated at a pressure such that the electrolyte remains in liquid form.

According to certain embodiments, operation of the electrochemical system can be performed while the electrochemical system is at least partially submerged in a water-containing environment. Thus, certain embodiments comprise at least partially submerging the electrochemical system in a water-containing environment. For example, referring to FIG. 1A, in some embodiments, environment 170 can be a water-containing environment.

In some such embodiments, the environment into which the electrochemical system is at least partially submerged contains water in a relatively high percentage. For example, in some embodiments, the environment into which the electrochemical system is at least partially submerged contains water in an amount of at least 50 wt %, at least 75 wt %, at least 90 wt %, at least 95 wt %, or at least 99 wt %. In some embodiments, the water-containing environment can be a saline aqueous solution. For example, the water-containing environment can be seawater. In certain embodiments, after the electrochemical system is submerged into the water-containing environment, at least a portion of the water within the water-containing environment is transported into the electrochemical system. The water may then be used, according to certain embodiments, as a reactant in an electrochemical reaction (e.g., as a reactant in an aluminum-water or aluminum-air electrochemical system).

As noted above, certain embodiments are related to precipitation control in electrochemical systems comprising an electrochemically active material comprising aluminum, such as aluminum-water electrochemical systems and aluminum-air electrochemical systems. Certain embodiments of this disclosure, which may include a precipitation trap, take advantage of heterogeneous precipitation reaction kinetics to passively collect and localize the majority (e.g., the overwhelming majority) of the aluminum hydroxide precipitate in a porous media such as but not limited to foam, which can then be ejected from the system. Under aqueous conditions at pH 14, the predominant aqueous aluminum species is generally aluminate in some embodiments. An important chemical reaction that occurs, according to certain embodiments, is the precipitation of aluminum hydroxide caused by the oversaturation of aluminate. This is because the aluminum waste product generally undergoes a phase transition from a dissolved aqueous species to a solid product through the following reaction:

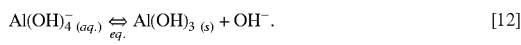

$$Al(OH)_4^- {}_{(aq.)} \underset{eq.}{\Leftrightarrow} Al(OH)_3 {}_{(s)} + OH^-. \qquad [12]$$

When aluminate is present in concentrations greater than the solubility limit, the aluminate generally precipitates through two mechanisms, according to certain embodiments. First, according to some such embodiments, small crystals will generally nucleate within the bulk volume of the fluid in a process termed homogeneous precipitation. Secondly, according to some such embodiments, if there is a favorable (e.g., rough or functionalized) surface or if there are seed particles present in the solution (e.g., either added or formed through homogeneous precipitation), heterogeneous precipitation will generally occur at the interface between the fluid and the solid surface. For heterogeneous precipitation, it is believed that the reaction is first order with respect to the aluminate concentration, implying that the reaction is driven by single aluminate anions contacting and reacting at the interface. Additionally, the heterogeneous precipitation rate is believed to be generally proportional to the number of surface vacancies for precipitation, which is in turn believed to be generally proportional to the total surface area of the system. The heterogeneous precipitation rate is generally believed to be dependent upon the surface properties including the composition and roughness of the surface.

In one set of embodiments, a process is described through which the aluminate waste from an Al—H$_2$O fuel cell, battery, or similar system can be passively collected in a porous media. This is believed to be a distinct and unique approach from other waste control methods employed in similar systems.

Although a pump is described in certain areas as driving the process, a different driving force such as gravity could be used to accomplish this purpose. The sole requirement is, according to certain embodiments, a flow through the precipitation trap.

Although an Al—H$_2$O fuel cell is described in certain areas herein, certain embodiments could employ any super-saturated aluminate waste stream under alkaline conditions, or a super-saturated aluminate waste stream under neutral or acidic conditions with the appropriate substitution of a chemically compatible foam and container.

According to certain embodiments, the precipitation trap comprises a chemically-compatible chamber containing an open cell foam or other open-cell porous media. Certain embodiments use machinery to replace the porous media saturated with aluminum hydroxide precipitate with fresh porous media either intermittently or continuously.

In some embodiments, the foam meets at least one of the following two tests to serve as a precipitation trap. In some embodiments, the foam is open cell, meaning there are fully percolated pore networks that enable a liquid to traverse the foam without adsorbing and diffusing through the polymer matrix. In some embodiments, the foam is chemically compatible (i.e., stable) when exposed to range of alkaline solutions (pH 12-15). While a polyester-polyether blend has been used, any chemically compatible foam (e.g., with pores on the order of centimeters to tens of microns) could accomplish this purpose, according to certain embodiments. The performance will generally vary based on the specific surface area of the foam, with greater surface area increasing the efficacy of the precipitation trap. Other porous media that are chemically stable and form a similar volume of traversable pores could also be used, according to certain embodiments.

According to certain embodiments, the inlet to the precipitation trap is supersaturated with aluminate. The efficiency of the process can be improved, according to certain embodiments, by adjusting the state variables to drop the saturation limit at the inlet, such as but not limited to decreasing the temperature or increasing the pressure.

In some embodiments, the alkaline electrolyte is recycled to create a closed system, although this is optional and not required to collect the precipitate in the foam. In some embodiments, the stream enters the precipitation trap with an oversaturation concentration of aluminate, as noted above. For a precipitation trap that approaches infinite size, the concentration of aluminate in the circulating electrolyte will approach the saturation concentration, according to certain embodiments.

According to certain embodiments, the theoretical maximum quantity of aluminate that can be removed in a single pass corresponds to the difference between the supersaturation concentration of aluminate and the solubility limit of aluminate at the temperature and pressure within the porous media. As the residence time of the supersaturated electrolyte in the porous media approaches infinity, the quantity of aluminate that is removed will generally approach this theoretical maximum, according to certain embodiments.

According to certain embodiments, the precipitation trap functions so long as the solution remains in the liquid state. In some embodiments, the precipitation trap functions for temperatures between 0° C. and 100° C. at atmospheric pressure (i.e., 1 atmosphere). In some embodiments, colder temperatures upstream increase the net amount of aluminate removed due to lowering the solubility limit of aluminate in the feed. In some embodiments, the precipitation trap will function at pressures greater than atmospheric with an upper bound on temperature dictated by the supercritical transition. In some such embodiments, increased pressure will increase the net quantity of aluminate removed as the dense crystalline structure of precipitated aluminum hydroxide is favored by the equilibrium reaction. According to certain embodiments, the process functions at pressures common at the seafloor (e.g., up to ~1000 bar).

According to some embodiments, a product (e.g., the sole product) made by this process is a polymer foam filled with crystalline aluminum hydroxide. While no additional products are necessarily desired in the specific example of the Al—H$_2$O fuel cell system, according to certain embodiments, this precipitate-filled foam could be recovered and the aluminum hydroxide recycled through additional processing.

According to certain embodiments, foam is used as a site for heterogeneous precipitation (as opposed to settling or filtering out solid particles, which may occur, for example, in a filter bed-type design). Certain embodiments involve a chemical reaction at the solid-liquid interface of the foam. In some such embodiments, an aqueous aluminate ion reacts with an active site (e.g., a rough point along the surface, an oxide group, or, after the first layer is deposited, existing aluminum hydroxide). According to certain embodiments, important design parameters include the total surface area of the foam and/or the residence time within the foam. According to certain embodiments, the surface of the foam itself may optionally be functionalized to uptake a solute via favorable chemical interactions (e.g., like an activated charcoal filter or an adsorption membrane).

According to certain embodiments, off-the-shelf open cell foams or other porous media can be used to assemble a precipitation and/or filtration device. Foams with a high porosity and specific surface area generally have more active sites for precipitation to form and thus will be more efficacious, according to certain embodiments. Additionally, the process is scalable according to certain embodiments, and will be, in some embodiments, efficacious under a range of extrinsic experimental conditions such as temperature and pressure, in some cases so long as the supersaturated aqueous solution is in the liquid phase.

Non-limiting examples of electrochemical systems and methods that can be used in association with certain of the systems and methods described herein are provided, for example, in International Patent Publication No. WO 2015/171849, filed as International Patent Application Number PCT/US2015/029596 on May 7, 2015, published on Nov. 12, 2015, and entitled "Hydrogen Management in Electrochemical Systems" and International Patent Publication No. WO 2016/036795, filed as International Patent Application Number PCT/US2015/048046 on Sep. 2, 2015, published on Mar. 10, 2016, and entitled "Injection of Water in Electrochemical Systems," each of which is incorporated herein by reference in its entirety for all purposes.

The following examples are intended to illustrate certain embodiments of the present invention, but do not exemplify the full scope of the invention.

EXAMPLE 1

Figure 7:
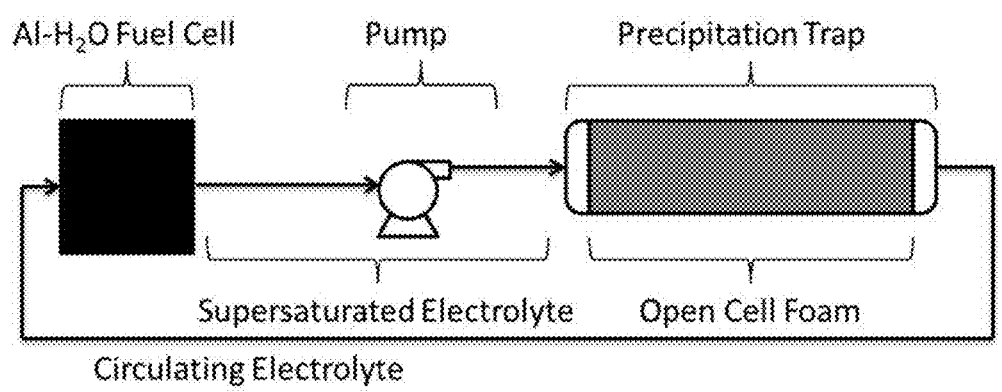
FIG. 7 is a schematic diagram of an exemplary electrochemical system.

This example describes the operation of an aluminum-water fuel cell (Al—H$_2$O fuel cell) in which a porous foam was used as a precipitation trap. FIG. 7 is a schematic illustration showing this precipitation trap testing apparatus. An experimental setup including a peristaltic pump, an Al—H$_2$O fuel cell, and the precipitation trap were assembled in the order shown in FIG. 7.

The pump was a Cole Parmer Master Flex L/S peristaltic pump. All component connections used Cole Parmer #17 silicone tubing with a 6.4 mm ID. The pump was run continuously at a flow rate of 100 mL/minute. The Al—H$_2$O fuel cell included a 1000 mL beaker and approximately 200 g of 4.5 mm thick aluminum pieces, although the amount of aluminum only serves to speed up or slow down the creation of waste. 700 mL of a 1.0 M aqueous KOH solution was used as the electrolyte. The electrolyte was topped up approximately every 2 days with approximately 80 mL of distilled water to account for evaporation and depletion of the H$_2$O and keep the pump suction tube submerged. The precipitation trap included the center tube and two end caps from a Top Fin® Aquarium Gravel Vacuum size medium filled with a 30 ppi open cell polyester-polyether blend foam obtained from Wisconsin Foams. The temperature was not controlled and fluctuated between 10° C. to 25° C. for a period up to 9 days.

After operating the experimental apparatus described above, 93% of the aluminum hydroxide weight by mass was localized in the foam. The remaining 7% was mostly in the beaker and distributed throughout the tubing.

EXAMPLE 2

This example describes operation of a system similar to that described in Example 1, in which the porous foam described in Example 1 was replaced with packed straws of varying diameters to form a precipitation trap, similar to the structure shown in FIG. 6, referenced above. Commercially available drinking straws and coffee stirrers, in diameters of 6 mm, 5 mm, and 2 mm, were packed into a Top Fin® Aquarium Gravel Vacuum, size medium. Otherwise, the experimental setup was identical to that described in Example 1. The temperature was not controlled and fluctuated between 15° C. to 25° C. for a period up to 5 days. Otherwise, the procedure was identical to that described in Example 1.

After operating the experimental apparatus as described above with respect to Example 1, approximately 41% of the aluminum hydroxide weight by mass was localized in the straws. The remainder (approximately 59%) was largely localized to the beaker with some distribution in the tubing.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A method of operating an electrochemical system, the method comprising:

transporting an aqueous electrolyte of the electrochemical system through a non-electrode porous medium configured to be a nucleation site, thereby precipitating a said comprising aluminum on a surface of the non-electrode porous medium, the surface at least partially comprising a pore surface of the non-electrode porous medium, wherein aluminum within the solid originates from a product of an electricity-generating electrochemical reaction between aluminum and water carried out using electrodes of the electrochemical system.

2. The method of claim 1, wherein at least 50% wt of the precipitation occurs within the non-electrode porous medium.

3. The method of claim 1, wherein the electrolyte is transported through the non-electrode porous medium by a pump; by gravity; by convection caused by a thermal gradient, or bubbles of rising gas; or by molecular diffusion.

4. The method of claim 1, wherein the solid comprises at least one of aluminum hydroxide ($Al(OH)_3$, aluminum oxide ($Al_2O_3$), and aluminum oxide hydroxide ($AlO(OH)$).

5. The method of claim 1, wherein the non-electrode porous medium includes at least one of an open cell foam, a prismatic medium, a polymer, and a functionalized surface.

6. The method of claim 1, wherein at least part of the non-electrode porous medium is capable of being removed from the system.

7. The method of claim 1, wherein the electrochemical system undergoes an electrochemical reaction that generates a gas.

8. The method of claim 1, further comprising operating the electrochemical system such that the non-electrode porous medium is expanded during operation of the electrochemical system.

9. The method of claim 1, wherein the non-electrode porous medium does not include poly(tetrafluoroethylene).

10. The method of claim 1, wherein average pore diameter of the pores of the nonelectrode porous medium is between 10 micrometers and 1 centimeter.

11. A method of operating an electrochemical system, the method comprising:
    transporting an aqueous electrolyte of the electrochemical system through a non-electrode porous medium configured to be a nucleation site, the non-electrode porous medium having pores, thereby precipitating a solid comprising aluminum on a surface of the non-electrode porous medium,
    wherein aluminum within the solid originates from a product of an electricity-generating electrochemical reaction between aluminum and water carried out using electrodes of the electrochemical system, wherein an average pore diameter of pores of the non-electrode porous medium is greater than or equal to 1 micrometer.

12. A method of operating an electrochemical system, the method comprising:
    transporting an aqueous electrolyte of the electrochemical system through a non-electrode porous medium configured to be a nucleation site, the non-electrode porous medium having pores, thereby precipitating a solid comprising aluminum on a surface of the non-electrode porous medium,
    wherein aluminum within the solid originates from a product of an electricity-generating electrochemical reaction between aluminum and water carried out using electrodes of the electrochemical system, wherein average pore diameter of the pores of the non-electrode porous medium is between 100 micrometers and 1 centimeter.

* * * * *